United States Patent
Shoup et al.

(10) Patent No.: US 12,387,384 B2
(45) Date of Patent: Aug. 12, 2025

(54) SYSTEMS AND METHODS FOR AUGMENTED REALITY APPLICATION

(71) Applicant: Oshkosh Corporation, Oshkosh, WI (US)

(72) Inventors: Douglas A. Shoup, Oshkosh, WI (US); Korry D. Kobel, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

(21) Appl. No.: 17/193,373

(22) Filed: Mar. 5, 2021

(65) Prior Publication Data
US 2021/0279914 A1     Sep. 9, 2021

Related U.S. Application Data

(60) Provisional application No. 62/986,008, filed on Mar. 6, 2020.

(51) Int. Cl.
| | |
|---|---|
| G06T 11/00 | (2006.01) |
| G06F 3/04847 | (2022.01) |
| G06V 20/20 | (2022.01) |

(52) U.S. Cl.
CPC .......... G06T 11/00 (2013.01); G06F 3/04847 (2013.01); G06V 20/20 (2022.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,824,933 A * | 10/1998 | Gabriel | ............... | G10H 1/0008 |
| | | | | 84/649 |
| 9,019,128 B1 * | 4/2015 | Kim, II | ................. | G01C 23/00 |
| | | | | 701/14 |
| 9,122,499 B2 * | 9/2015 | Bittner | ............... | G06F 11/3003 |
| 9,557,807 B2 * | 1/2017 | Mick | ....................... | G06Q 10/06 |
| 9,600,733 B1 * | 3/2017 | Wilbert | ................. | G06V 20/62 |
| 10,048,158 B2 * | 8/2018 | Lawler | ................ | A01G 23/081 |
| 10,216,996 B2 * | 2/2019 | Black | ..................... | G06V 20/70 |
| 10,488,215 B1 * | 11/2019 | Yu | ........................ | G01C 21/365 |
| 10,657,721 B2 * | 5/2020 | Yin | ......................... | G06F 30/00 |

(Continued)

FOREIGN PATENT DOCUMENTS

WO     WO-2018/222756     12/2018

OTHER PUBLICATIONS

International Search Report and Written Opinion regarding PCT PCT/US2021/021110, Dtd Jun. 9, 2021, 12 pps.

*Primary Examiner* — William L Bashore
*Assistant Examiner* — Koorosh Nehchiri
(74) *Attorney, Agent, or Firm* — FOLEY & LARDNER LLP

(57) ABSTRACT

A method for optimizing equipment inspection for a machine using augmented reality (AR) is shown. The method includes providing an AR application to a user interface. The method further includes displaying one or more selectable widgets on the user interface via AR functionality. The method further includes receiving, via the user interface, a selection of the selectable widget, the selection providing instructions to provide additional material based on the selectable widget. The method further includes displaying a detailed model of the machine based on the additional material received.

20 Claims, 38 Drawing Sheets

(56) References Cited

U.S. PATENT DOCUMENTS

| | | | | |
|---|---|---|---|---|
| 10,867,327 | B1* | 12/2020 | Wilbert | G06Q 30/0611 |
| 10,878,240 | B2* | 12/2020 | Laycock | G06V 10/235 |
| 2012/0251996 | A1* | 10/2012 | Jung | G05B 19/4183 |
| | | | | 434/365 |
| 2013/0066527 | A1* | 3/2013 | Mizuochi | E02F 9/24 |
| | | | | 701/50 |
| 2013/0281209 | A1* | 10/2013 | Lyons | A63F 13/53 |
| | | | | 463/33 |
| 2015/0112704 | A1* | 4/2015 | Braun | G06Q 10/10 |
| | | | | 705/2 |
| 2016/0173816 | A1* | 6/2016 | Huenerfauth | G06Q 10/20 |
| | | | | 348/14.02 |
| 2016/0189252 | A1* | 6/2016 | Ryan | G06Q 30/0281 |
| | | | | 705/346 |
| 2016/0258134 | A1* | 9/2016 | Matsumoto | B60R 1/26 |
| 2017/0087465 | A1* | 3/2017 | Lyons | G06T 19/006 |
| 2018/0129276 | A1* | 5/2018 | Nguyen | G09B 9/00 |
| 2018/0130260 | A1* | 5/2018 | Schmirler | G06F 3/011 |
| 2018/0253876 | A1* | 9/2018 | Lin | G06K 7/10722 |
| 2018/0307045 | A1* | 10/2018 | Nishi | G02B 27/017 |
| 2018/0336732 | A1* | 11/2018 | Schuster | G06Q 10/0875 |
| 2018/0365495 | A1* | 12/2018 | Laycock | G06K 9/2081 |
| 2019/0339841 | A1* | 11/2019 | Nanjappan | H04W 4/029 |
| 2020/0034622 | A1* | 1/2020 | Thakurta | G05B 15/02 |
| 2020/0074831 | A1* | 3/2020 | Yun | G08B 21/0492 |
| 2020/0095105 | A1 | 3/2020 | Yutzy et al. | |
| 2020/0126445 | A1* | 4/2020 | Tan | G09B 5/06 |
| 2020/0193203 | A1* | 6/2020 | Fink | G06T 7/73 |
| 2020/0250890 | A1* | 8/2020 | Zhou | G06T 7/55 |
| 2020/0252302 | A1* | 8/2020 | Lairsey | G06K 9/00671 |
| 2020/0293778 | A1* | 9/2020 | Elliott | B66F 7/00 |
| 2020/0394012 | A1* | 12/2020 | Wright, Jr. | G06F 3/011 |
| 2021/0060366 | A1 | 3/2021 | Minnick et al. | |

* cited by examiner

SYSTEMS AND METHODS FOR AUGMENTED REALITY APPLICATION

CROSS-REFERENCE TO RELATED APPLICATION

This application claims the benefit of and priority to U.S. Provisional Application No. 62/986,008, filed Mar. 6, 2020, which is incorporated herein by reference in its entirety.

BACKGROUND

Conventional methods of modeling building equipment rely on virtual modeling and/or modeling based on physical operational parameters. There exists a need to provide a method for improving building equipment modeling with augmented reality applications.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a method for optimizing equipment inspection for a machine using augmented reality (AR). The method includes providing an AR application to a user interface. The method further includes displaying one or more selectable widgets on the user interface via AR functionality. The method further includes receiving, via the user interface, a selection of the selectable widget, the selection providing instructions to provide additional material based on the selectable widget. The method further includes displaying a detailed model of the machine based on the additional material received.

Another implementation of the present disclosure is a system for optimizing equipment inspection for a machine using augmented reality (AR). The system includes a user device to display a user interface and the machine. The system further includes a server including a processing circuit that includes one or more processors and memory storing instructions that, when executed by the one or more processors, cause the one or more processors to perform operations. The operations include providing an AR application to a user interface and displaying one or more selectable widgets on the user interface via AR functionality. The operations further include receiving, via the user interface, a selection of the selectable widget, the selection providing instructions to provide additional material based on the selectable widget. The operations further include displaying a detailed model of the machine based on the additional material received.

Another implementation of the present disclosure is a building equipment inspection tool for inspecting equipment vi augmented reality (AR). The tool includes a non-transitory computer-readable medium having instructions stored thereon that, when executed by one or more processors, cause the one or more processors to implement operations. The operations include providing an AR application to a user interface and displaying one or more selectable widgets on the user interface via AR functionality. The operations further include receiving, via the user interface, a selection of the selectable widget, the selection providing instructions to provide additional material based on the selectable widget. The operations further include displaying a detailed model of the machine based on the additional material received.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
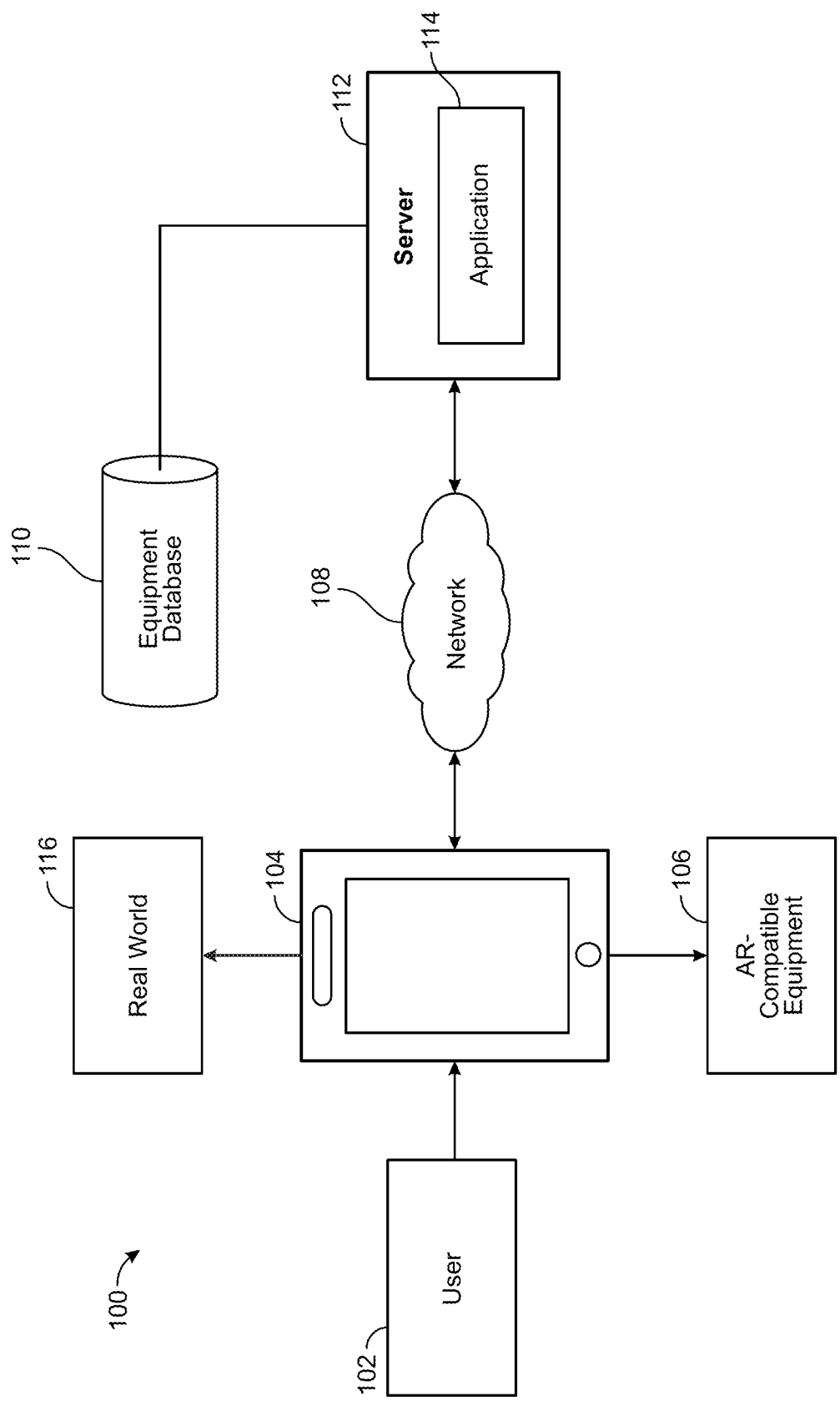
FIG. 1 is a block diagram of a modeling system, according to an exemplary embodiment.

Before turning to the figures, which illustrate the exemplary embodiments in detail, it should be understood that the present application is not limited to the details or methodology set forth in the description, illustrated in the figures. It should also be understood that the terminology is for the purpose of description only and should not be regarded as limiting.

Overview

Throughout the life of a construction project, various pieces of construction equipment are required to perform various tasks at different times. This may require modeling of the equipment that allow the equipment users (e.g., technicians, construction workers, etc.) to predict the operation of a piece of equipment prior to using the equipment at the worksite. For example, a particular boom lift model may have a limited range of motion. Modeling software (e.g., a CAD model, etc.) may be used to determine the operational parameters of the boom lift and determine whether the modeled boom lift indicates that the boom lift is capable of performing the required tasks at a worksite (e.g., construction site).

Accordingly, a modeling application that optimizes a user's ability to determine parameters of a piece of building equipment (e.g., boom lift, scissor lift, etc.) and/or facilitate the readiness of such equipment, is advantageous in the field. In some embodiments, this may be performed via an application (e.g., workstation application, phone application, website application, etc.) for a user that allows for modeling, analysis, inspection, and/or troubleshooting via augmented reality (AR).

In some embodiments, the AR application may include a decal recognition module configured to detect equipment decals and match the equipment decal with stored equipment information (e.g., equipment manual, etc.). The AR application may overlay a widget onto the user interface of the application after detection of the decal, such that a user may select the widget to display more detailed information relating to the building equipment. This information may be based on the detected decal, and providing a related equipment manual stored in an on premise database. The displayed information is not limited to equipment manuals and may include engineering drawings or vector graphics models (e.g., CorelDRAW models, etc.).

In some embodiments, the AR application includes an operation module configured to detect control panels and overlay computer-aided design (CAD) models on the user interface of the application using augmented reality. The AR application can receive a selection of a switch, joystick, or indicator via the user interface and display equipment information based on the selection. In some embodiments, the selection is made by a user after the CAD model overlay is implemented. The AR application may be configured to detect up to, but not limited to, 10 configurations of control panels. In some embodiments, the control panels are for boom lifts, scissor lifts, vertical lifts, compact crawler booms (CCB), and other equipment.

In some embodiments, the AR application includes annual inspection module for guiding a user (e.g., technician, equipment operator, etc.) through a series of inspection steps for inspecting the equipment. The user may provide machine, owner, and/or technician information that allows the application to determine the inspection steps for the user. The AR application my provide guiding indicators on/at/near the equipment when a user views the equipment through the application (e.g., via a camera on a smartphone, etc.). The user may select the guides to facilitate the inspection process. In some embodiments, this module can be implemented for boom lifts, scissor lifts, vertical lifts, vertical push arounds, and other equipment.

In some embodiments, the AR application includes a machine visualization module for visualizing equipment products overlaid in the real world through user devices (e.g., smartphones, tablets, etc.). The user may be able to scroll through a library of machine profiles to find machines available for a particular job. Once the machine profile is selected, the user may be prompted to place the machine on a surface (e.g., a flat surface in near the camera on the user device). Once the virtual machine is placed in the real world, a user may walk around the machine, inspect the machine, and adjust the machine settings. For example, if the user wants to see how far a boom lift may reach, the user may place the virtual machine in the real world and provide an instruction to the application that raises the virtual boom lift to its maximum height. In some embodiments, the machine visualization module includes, but is not limited to, over 125 building information models (BIMs) stored in a local database.

In some embodiments, the AR application includes an attachment visualization module for visualizing attachments for equipment overlaid in the real world through user devices. The attachment visualization module may be similar to the machine visualization module in that various attachment profiles are stored (e.g., on a local database, externally on a server, etc.) such that a user may select an attachment from a plurality of attachment profiles. This may be done so a user can see what a particular attachment (e.g., a handle) would look like overlaid on a real world piece of equipment. In some embodiments, the attachment visualization module has access to over 30 kits/accessories/attachments for overlaying on a real world piece of equipment.

In some embodiments, the AR application includes a remote troubleshooting module configured to troubleshoot faults (e.g., equipment issues, system issues, etc.) within an equipment system. This may include faults with the processing circuitry of the equipment (e.g., machine software information, etc.). The remote troubleshooting module may also include a method for contacting support for the equipment, in the event that the equipment needs to be serviced. The remote troubleshooting module may also include video sharing capabilities that allow the user to share their screen (e.g., interface of the application, etc.) with a support technician. The support technician may interact (e.g., draw on the user's screen, etc.) with the user interface to provide support via the application, which may include interaction via AR.

Augmented Reality Application

Referring now to FIG. 1, a system 100 for implementing an augmented reality (AR) application for equipment is shown, according to an exemplary embodiment. System 100 may be a system for modeling equipment (e.g., lifts, boom lifts, scissor lifts, etc.) to facilitate predictable and reliable operation of the equipment at the worksite. System 100 is shown to include user 102, user device 104, AR-compatible equipment 106, network 108, equipment database 110, sever 112, application 114, and real world 116.

User 102 may include any individual capable of engaging with the application (e.g., AR application, etc.) via one or more user devices 104. In an exemplary embodiment, user 102 is a technician responsible for modeling, inspecting, and/or troubleshooting the equipment (e.g., AR-compatible equipment 106, etc.). In other embodiments, user 102 includes equipment operators, foreman, customers, and other individuals that may be associated with the project for which the equipment is needed.

User device 104 may be configured to display the AR application. In some embodiments, user device 104 is a smartphone, tablet, or other portable processing device. In other embodiments, user device 104 is a workstation capable of providing the application to a monitor for display/interaction. User device 104 may include several devices that allow more than one user to engage with the AR application. In such an embodiment, user device 104 may refer to multiple smartphones or multiple tablets for technicians at a worksite.

AR-compatible equipment 106 may include one or more pieces of equipment that have been analyzed and have had their equipment information (e.g., manuals, technical drawings, CAD models, etc.), such that the equipment information may be incorporated into the AR application. AR-compatible equipment 106 may include boom lifts, scissor lifts, vertical lifts, and other equipment and/or lifts for construction. For example, a boom lift model A1 may have an operating manual, a CAD model, and a technical specification. These files are stored on a database (e.g., equipment database 110) and queried by the AR application. When the AR application detects a decal of boom lift model A1, the application will provide a selectable widget overlaid on the decal. When selected by the user, the AR application may provide the operating manual, CAD model, and technical specification of the boom lift model A1 to user 102 via the user interface of user device 104.

Network 108 may include one or more routers configured to route data from server 112 to user device 104. In some embodiments, network 108 spans several buildings or regions such that server 112 is located off-premise from user device 104 and/or AR-compatible equipment 106. For example, server 112 may be located at a datacenter and AR-compatible equipment 106 is located in a building several hundred miles away. Network 108 may connect these two locations via a collection of interconnected networks (e.g., the Internet, a cloud, etc.).

Equipment database 110 may be a database configured to store information relating to equipment from AR-compatible equipment 106. In some embodiments, various equipment determined or selected to be compatible for the AR application have a set of information (e.g., technical manuals, technical specifications, CAD models, engineering drawings, etc.) that provide the operational details of the equipment. Equipment database 110 may be configured to store this information and provide the information to the AR application (e.g., application 114) upon request. Equipment database 110 may be located locally (e.g., in the same building or region as AR-compatible equipment 106) or off-premise. In other embodiments, equipment database 110 is located within server 112 and application 114 does not need to query an external database for equipment information.

Server 112 may be any platform configured to store, process, and secure data. In some embodiments, server 112 is a database server configured to store and process application 114. Application 114 may be provided as software-as-a-service (SaaS). The software for application 114 may be licensed to user 102 to use on user device 104, but application 114 may remain hosted (e.g., stored, etc.) on server 112. In other embodiments, application 114 is stored and processed on user device 104. In an exemplary embodiment, server 112 is shown to query equipment information from equipment database 110. While system 100 shows application 114 being hosted off-premise, the hosting and processing may be performed on user device 104 or a local sever.

Figure 2A:
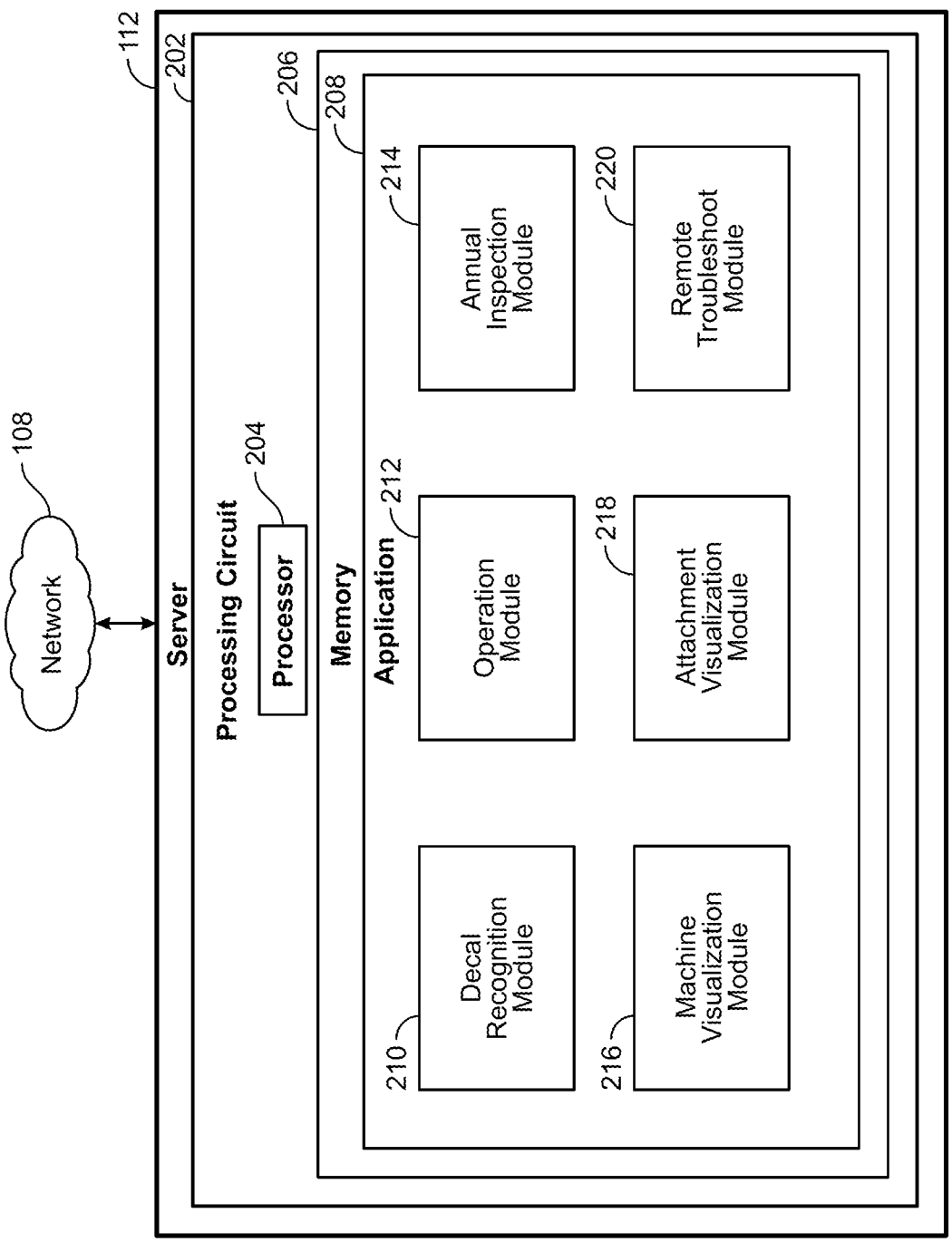
FIG. 2 is a detailed block diagram of the server of FIG. 1, according to an exemplary embodiment.
Figure 2B:
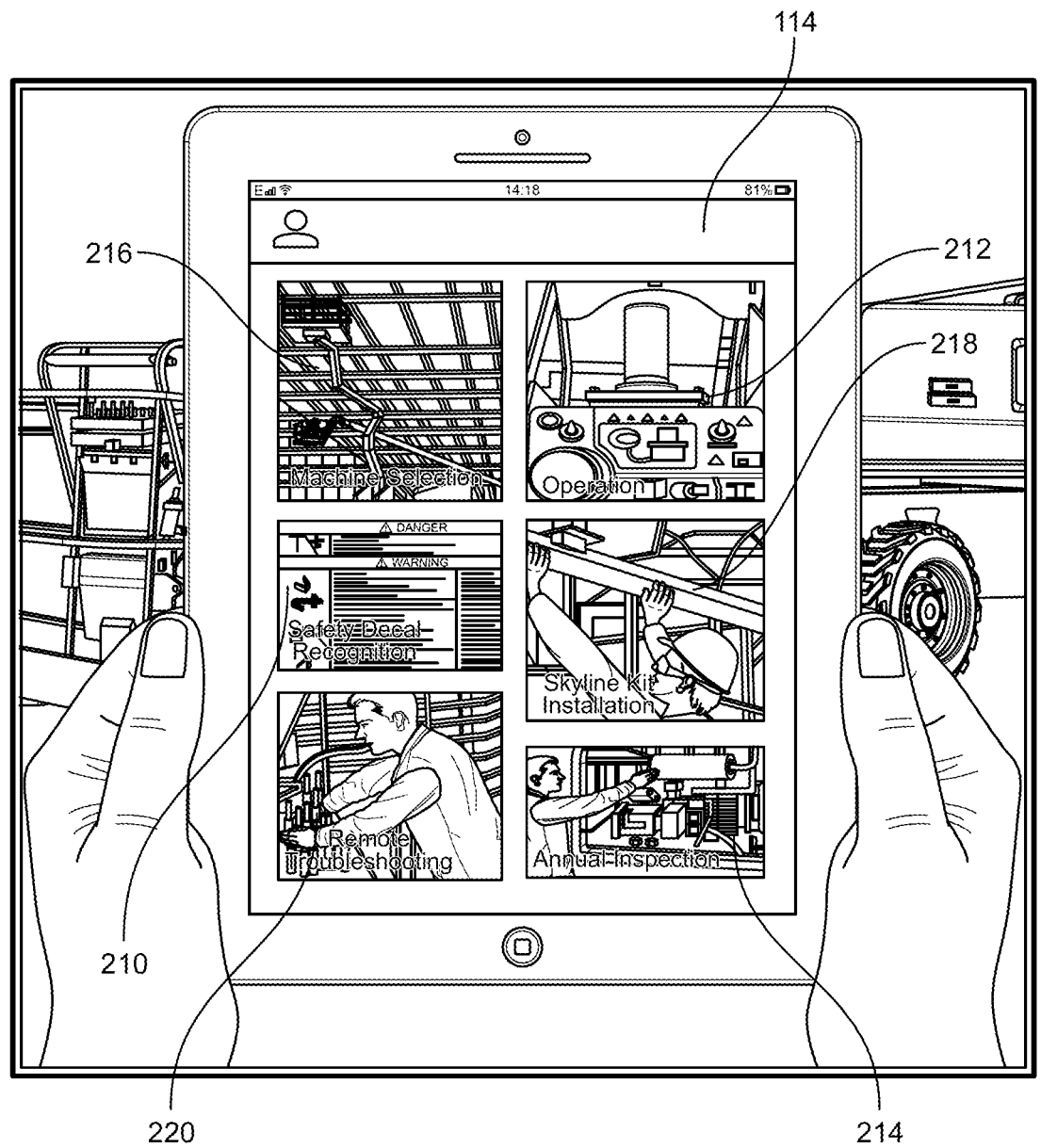

Referring now to FIG. 2, a detailed block diagram of server 112 is shown, according to an exemplary embodiment. Server 112, as shown in FIG. 2, may be connected within system 100 in similar fashion as shown in FIG. 1. Server 112 is shown to include processing circuit 202 including processor 204 and memory 206. Processing circuit 202 can be communicably connected to server 112 such that processing circuit 202 and the various components thereof can send and receive data via a communications interface. Processor 204 can be implemented as a general purpose processor, an application specific integrated circuit (ASIC), one or more field programmable gate arrays (FPGAs), a group of processing components, or other suitable electronic processing components.

Memory 206 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 206 can be or include volatile memory or non-volatile memory. Memory 206 can include database components, object code components, script components, or any other type of information structure for supporting the various activities and information structures described in the present application. According to an example embodiment, memory 206 is communicably connected to processor 204 via processing circuit 202 and includes computer code for executing (e.g., by processing circuit 202 and/or processor 204) one or more processes described herein. Memory 212 is shown to include application 208.

Application 114 may include one or more programs provided to an end user (e.g., user 102, etc.). As used herein, application 114, "the application," and "the AR application" may be used interchangeably. In some embodiments, application 114 is implemented within a single computer (e.g., one server, one housing, etc.), such as server 112 as shown in FIG. 2. In various other embodiments application 114 can be distributed across multiple servers or computers (e.g., that can exist in distributed locations). Application 114 is shown to include decal recognition module 210, operation module 212, annual inspection module 214, machine visualization module 216, kit visualization module 218, and remote troubleshoot module 220.

Decal recognition module 210 may be configured to detect equipment decals and match the equipment decal with stored equipment information (e.g., equipment manual, etc.). In some embodiments, decal recognition module 210 may overlay a widget onto the user interface of the application after detection of the decal, such that a user may select the widget to display more detailed information relating to the building equipment. This information may be based on the detected decal, and providing a related equipment manual stored in an on premise database. The displayed information is not limited to equipment manuals and may include engineering drawings or vector graphics models (e.g., CorelDRAW models, etc.). Further detail regarding decal recognition module 210 is described in greater detail below with reference to FIGS. 3A-4.

Operation module 212 may be configured to detect control panels and overlay computer-aided design (CAD) models on the user interface of the application using augmented reality. Operation module 212 may receive a selection of a switch, joystick, or indicator via the user interface and display equipment information based on the selection. In some embodiments, the selection is made by a user after the CAD model overlay is implemented. In some embodiments, operation module 212 is configured to detect up to, but not limited to, 10 configurations of control panels. In some embodiments, the control panels are for boom lifts, scissor lifts, vertical lifts, compact crawler booms (CCB), and other equipment.

Annual inspection module 214 may be configured to guide user 102 (e.g., technician, equipment operator, etc.) through a series of inspection steps for inspecting the equipment. Annual inspection module 214 may provide machine, owner, and/or technician information that allows the application to determine inspection steps user 102. In some embodiments, module 214 provides guiding indicators on/at/near AR-compatible equipment 106 when user 102 views equipment 106 through the application (e.g., via a camera on a smartphone, etc.). The user may select the guides to facilitate the inspection process. In some embodiments, this module can be implemented for boom lifts, scissor lifts, vertical lifts, vertical push arounds, and other equipment.

Machine visualization module 214 may be configured to display equipment products overlaid in the real world through user devices (e.g., smartphones, tablets, etc.). The user may be able to scroll through a library of machine profiles to find machines available for a particular job. Once the machine profile is selected, the user may be prompted to place the machine on a surface (e.g., a flat surface in near the camera on the user device). Once the virtual machine is placed in the real world, a user may walk around the machine, inspect the machine, and adjust the machine settings. For example, if the user wants to see how far a boom lift may reach, the user may place the virtual machine in the real world and provide an instruction to the application that raises the virtual boom lift to its maximum height. In some embodiments, the machine visualization module includes, but is not limited to, over 125 building information models (BIMs) stored in a local database.

Attachment visualization module 218 may be configured for visualizing attachments for equipment overlaid in the real world through user devices. Attachment visualization module 218 may be similar to the machine visualization module in that various attachment profiles are stored (e.g., on a local database, externally on a server, etc.) such that a user may select an attachment from a plurality of attachment profiles. This may be done so a user can see what a particular attachment (e.g., a handle) would look like overlaid on a real world piece of equipment. In some embodiments, attachment visualization module 218 has access to over 30 kits/accessories/attachments for overlaying on a real world piece of equipment.

Remote troubleshooting module 220 may be configured to troubleshoot faults (e.g., equipment issues, system issues, etc.) within an equipment system. This may include faults with the processing circuitry of the equipment (e.g., machine software information, etc.). The remote troubleshooting module may also include a method for contacting support for the equipment, in the event that the equipment needs to be serviced. Remote troubleshooting module 220 may also include video sharing capabilities that allow the user to share their screen (e.g., interface of the application, etc.) with a support technician. The support technician may interact (e.g., draw on the user's screen, etc.) with the user interface to provide support via the application, which may include interaction via AR.

Figure 3A:
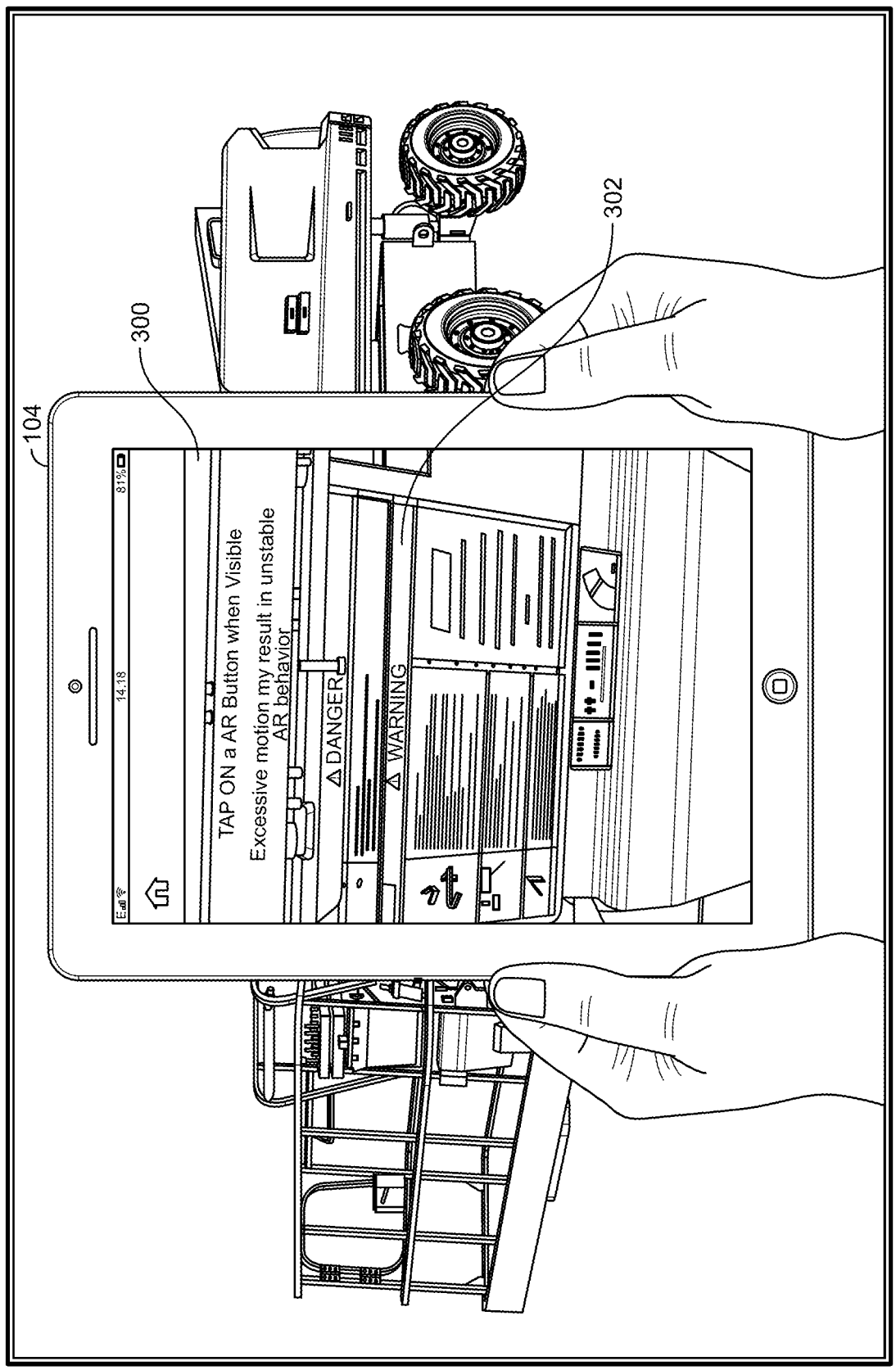
FIGS. 3A-D are graphical user interfaces of the application of FIG. 2, according to exemplary embodiments.
Figure 3B:
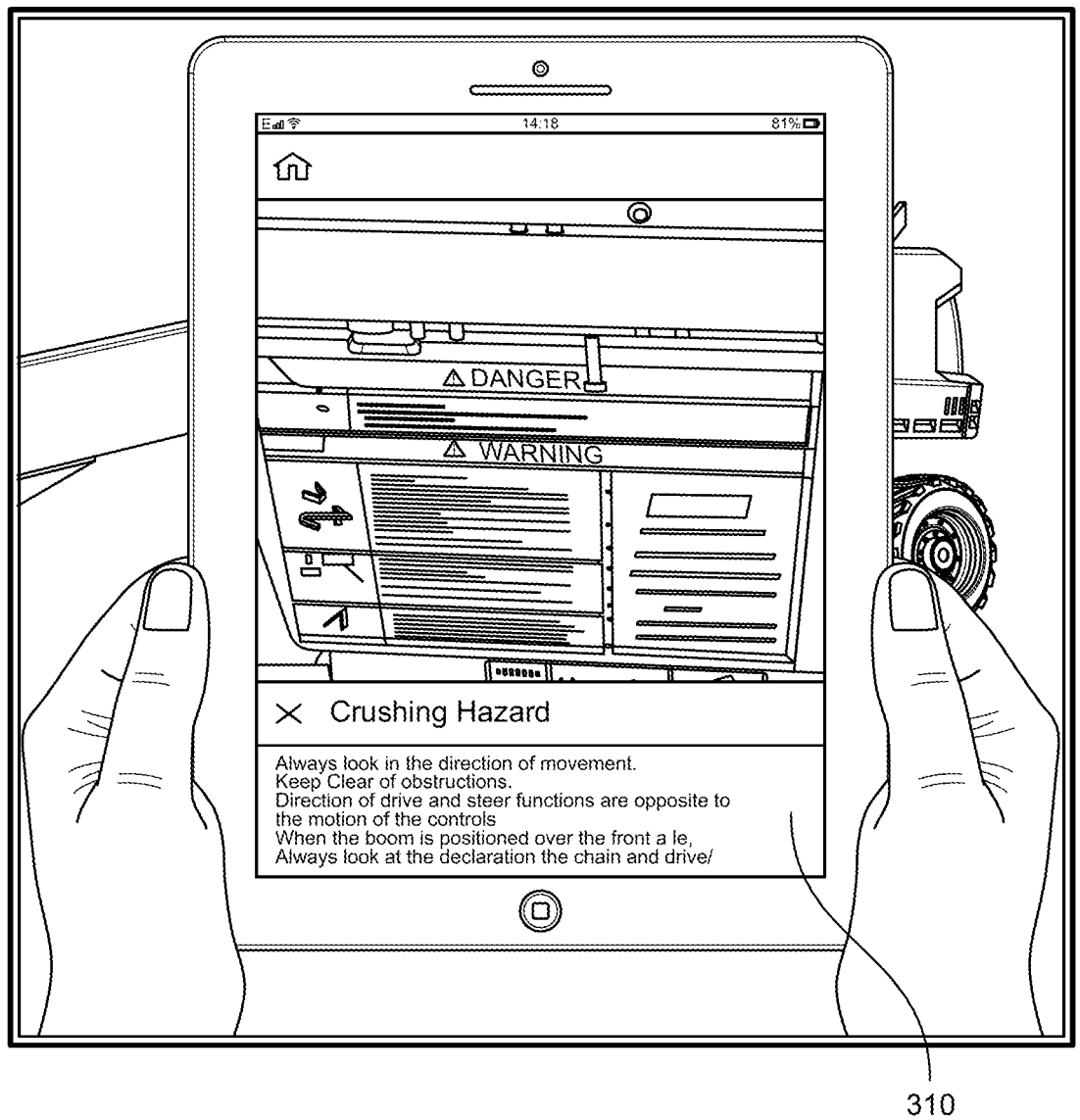
Figure 3C:
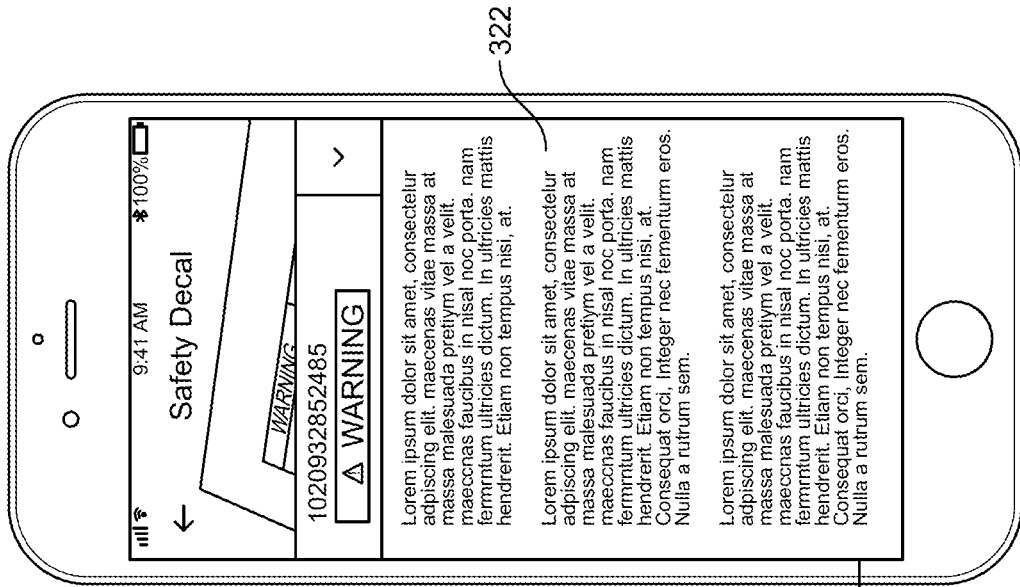
Figure 3C:
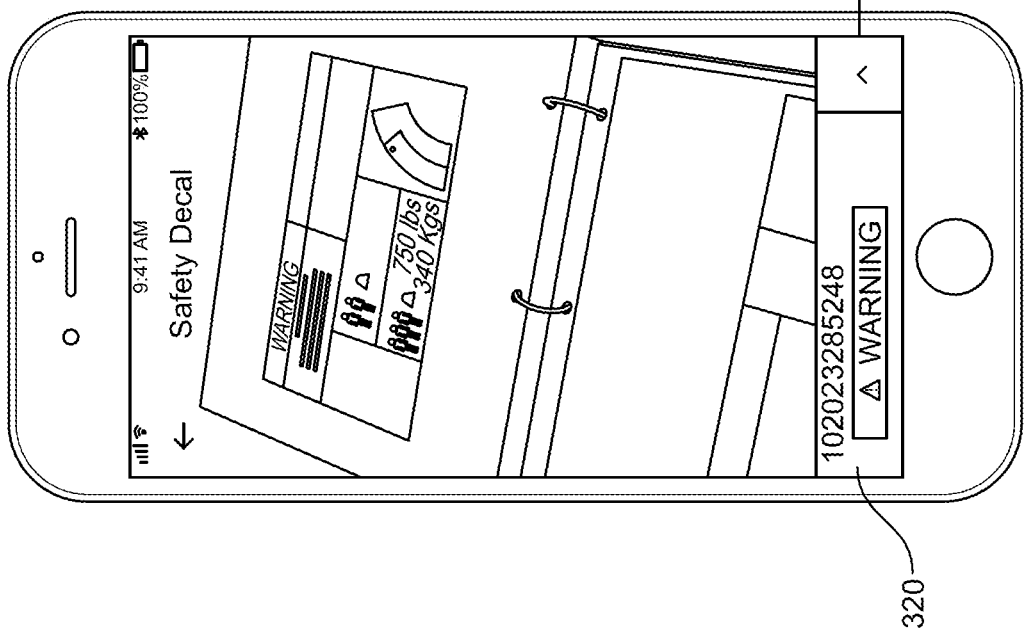

Referring now to FIGS. 3A-D, various embodiments of interface 300 displaying application 114 are shown, according to exemplary embodiments. Referring to FIG. 3A, interface 300 is shown to be a graphical user interface for displaying AR functionality. Widget 302 may be provided on interface 300 to be selected by user 102. Referring to FIG. 3B, a warning window 310 is shown on interface 300. Warning window 310 may be configured to displaying critical information to user 102 after the decal has been selected. This critical information may be or include precautionary recommended measures to be taken when handling the equipment or information related to operation of the equipment. Referring to FIG. 3C, another warning window 320 is shown in interface 300. Warning window 320 may be selected by user 102 to provide a detailed warning window 322 (see FIG. 3C) that provides detailed information to user 102 regarding the equipment.

Figure 3D:
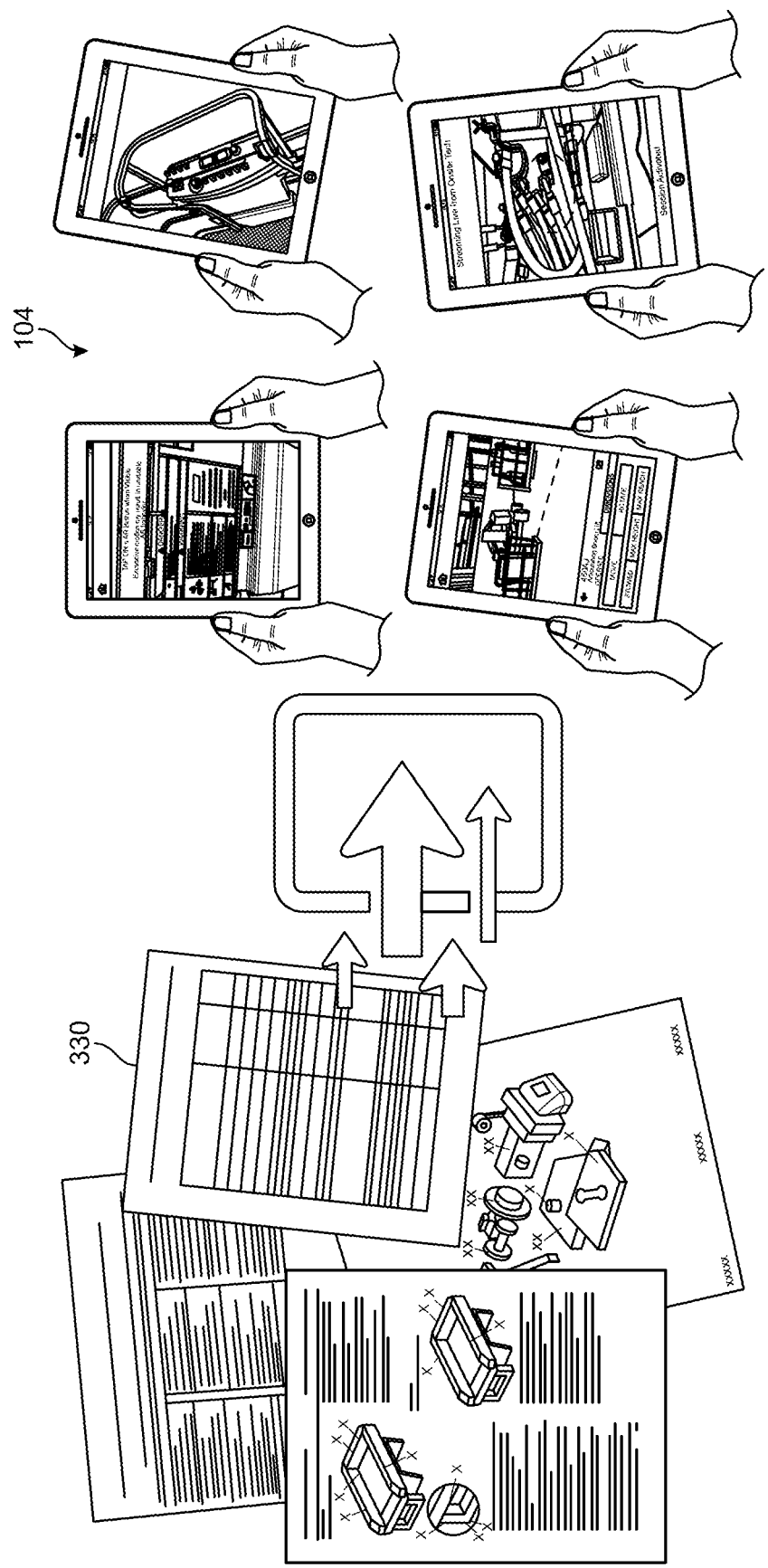

Referring to FIG. 3D, a diagram for providing equipment information to application 114 is shown, according to an exemplary embodiment. FIG. 3D shows equipment information 330 being provided to user devices 104 which are displaying interface 300. In some embodiments, some or all of the information on the documents (e.g., equipment information 330) can be shown on the user devices 104. In some embodiments, application 114 is configured to capture the information via a picture and application software can process the documentation information to be used for future application purposes.

Figure 4:
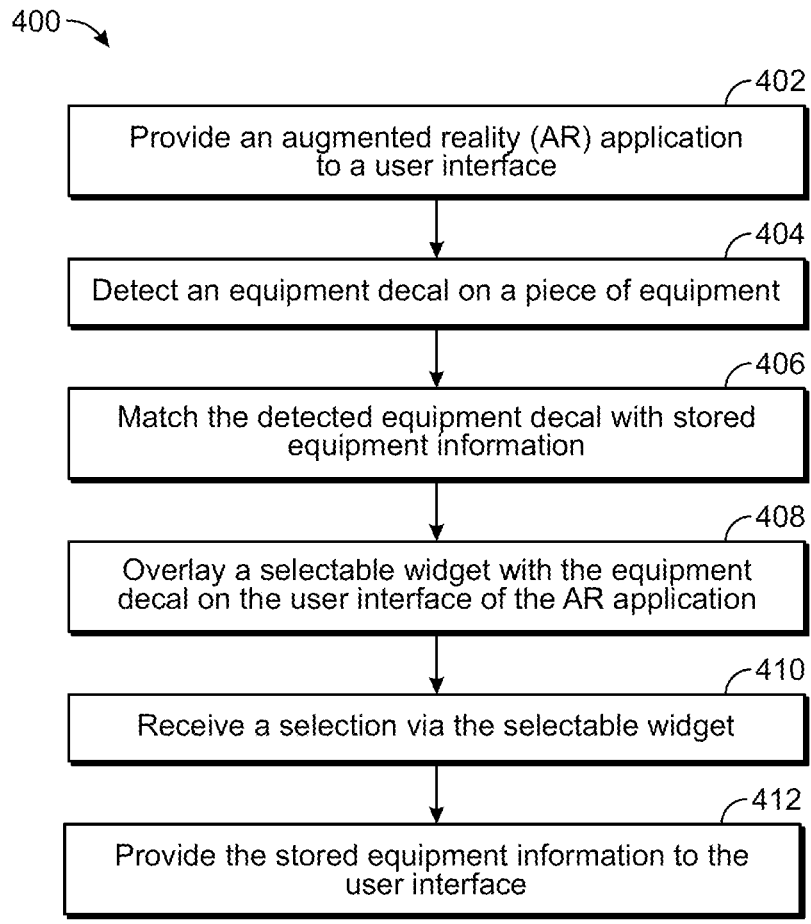
FIG. 4 is a flow diagram of a process for performing decal recognition, which may be performed by the application as shown in FIG. 2, according to an exemplary embodiment.

Referring now to FIG. 4, a process 400 for recognizing decals on equipment is shown, according to an exemplary embodiment. Process 400 may be implemented by application 114 within server 112. Process 400 is shown to include providing an augmented reality application to a user interface (step 402). In an exemplary embodiment, user device 104 displays application 114 which may be an application that provides augmented reality functionality. Application 114 may be provided to an interface of user device 104 via instructions from user 102, such as clicking on an application icon on user device 104.

Process 400 is shown to include detecting one or more equipment decals (step 404). A decal, as described herein, may refer to any design, symbol, text, or other type of information printed or stamped onto a machine for viewing purposes, such as danger, warning, caution, important, and notice stickers. User 102 may view a machine (e.g., piece of equipment) through the camera of user device 104 while displaying application 114. Application 114 may detect a decal located on the piece of equipment when user 102 points the camera of user device 104 at the piece of equipment.

Process 400 is shown to include matching one or more equipment decals with stored equipment information (step 406). When application 114 detects a decal, application 114 may match the decal with stored equipment information from equipment database 110. Application 114 may query equipment database 110 prior to detecting a decal or after. For example, after application 114 detects a decal, application 114 may read a model number for the piece of equipment and query equipment database 110 for equipment information for that particular model number.

Process 400 is shown to include overlaying a selectable widget on the user interface of the application (step 408) and receiving a selection via the selectable widget (step 410). Once application 114 receives equipment information for the appropriate equipment, application 114 may provide a selectable widget for user 102 to engage with (e.g., click on, tap, etc.). The widget may be overlaid on top of the decal in the interface. For example, when user 102 views the decal through the camera of user device 104 and application 114 provides the overlaid selectable widget on the top of the decal, it may appear is a lightly colored (e.g., light-blue, etc.) transparent square of the same dimensions as the decal. When user 102 clicks on the widget, this may prompt application 114 to provide user 102 with equipment information for that particular piece of equipment.

Process 412 is shown to include providing equipment information to the user interface (step 412). In step 412, application 114 may provide the equipment information relating to the decal that may have been queried from equipment database 110. In an exemplary embodiment, application 114 can query over 1,000 decals for different pieces/models of equipment. In other embodiments, application 114 recognizes approximately 1,600 decals that can be identified for use. Application 114 may be configured to receive new equipment information added to equipment database 110.

Referring now to FIGS. 5A-D, various embodiments of interface 502 are shown, according to exemplary embodiments. Interface 502 may be partially or entirely included within interface 300. In some embodiments, application 114 is responsible for processing, generating and/or hosting some or all of the interfaces described herein, such as interface 300 and interface 502. FIGS. 5A-D may be configured to show various steps through a process (e.g., process 600, etc.) for implementing operation module 212 on user device 104.

Figure 5A:
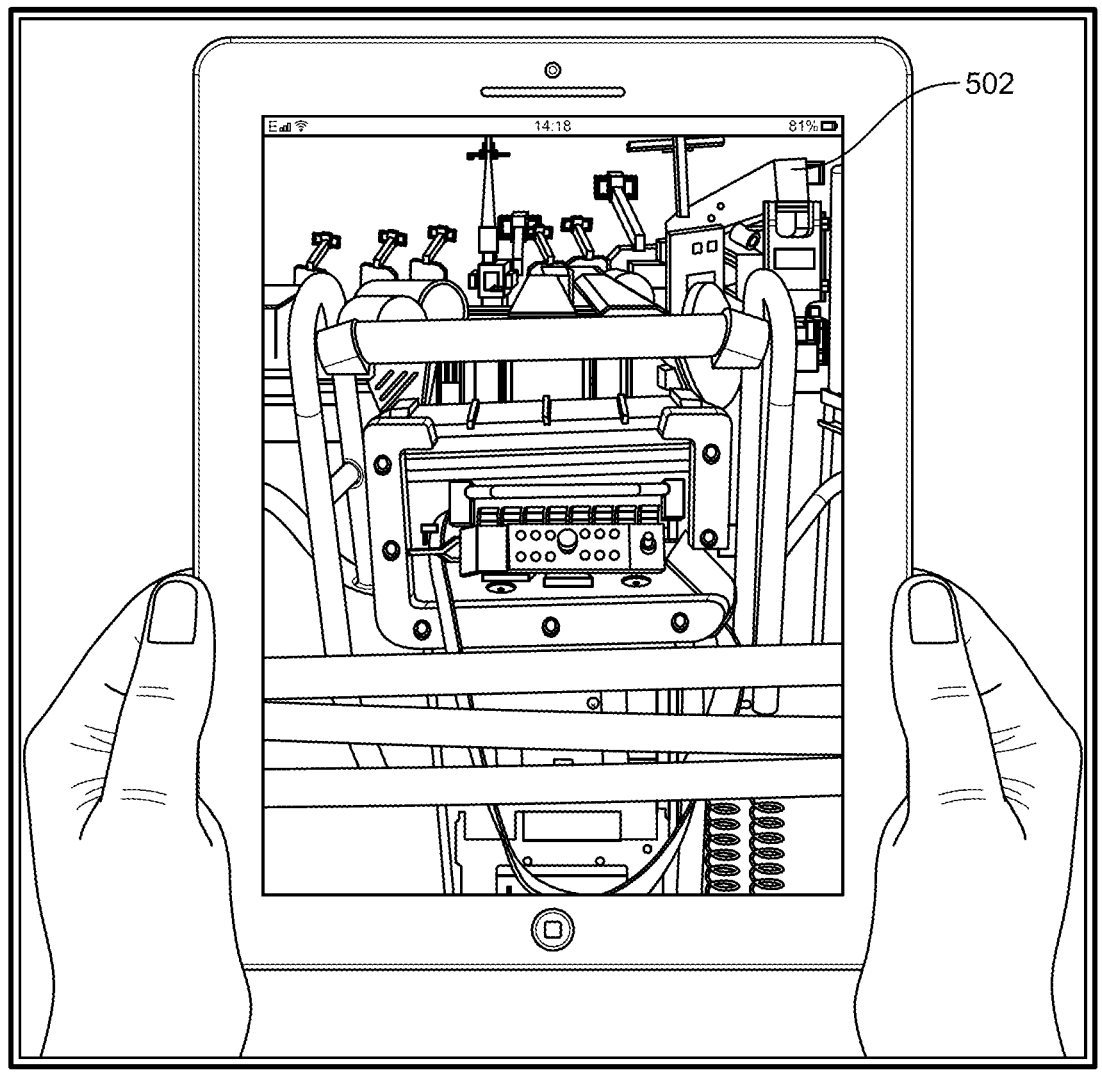
FIGS. 5A-D are graphical user interfaces of the application of FIG. 2, according to exemplary embodiments.
Figure 5B:
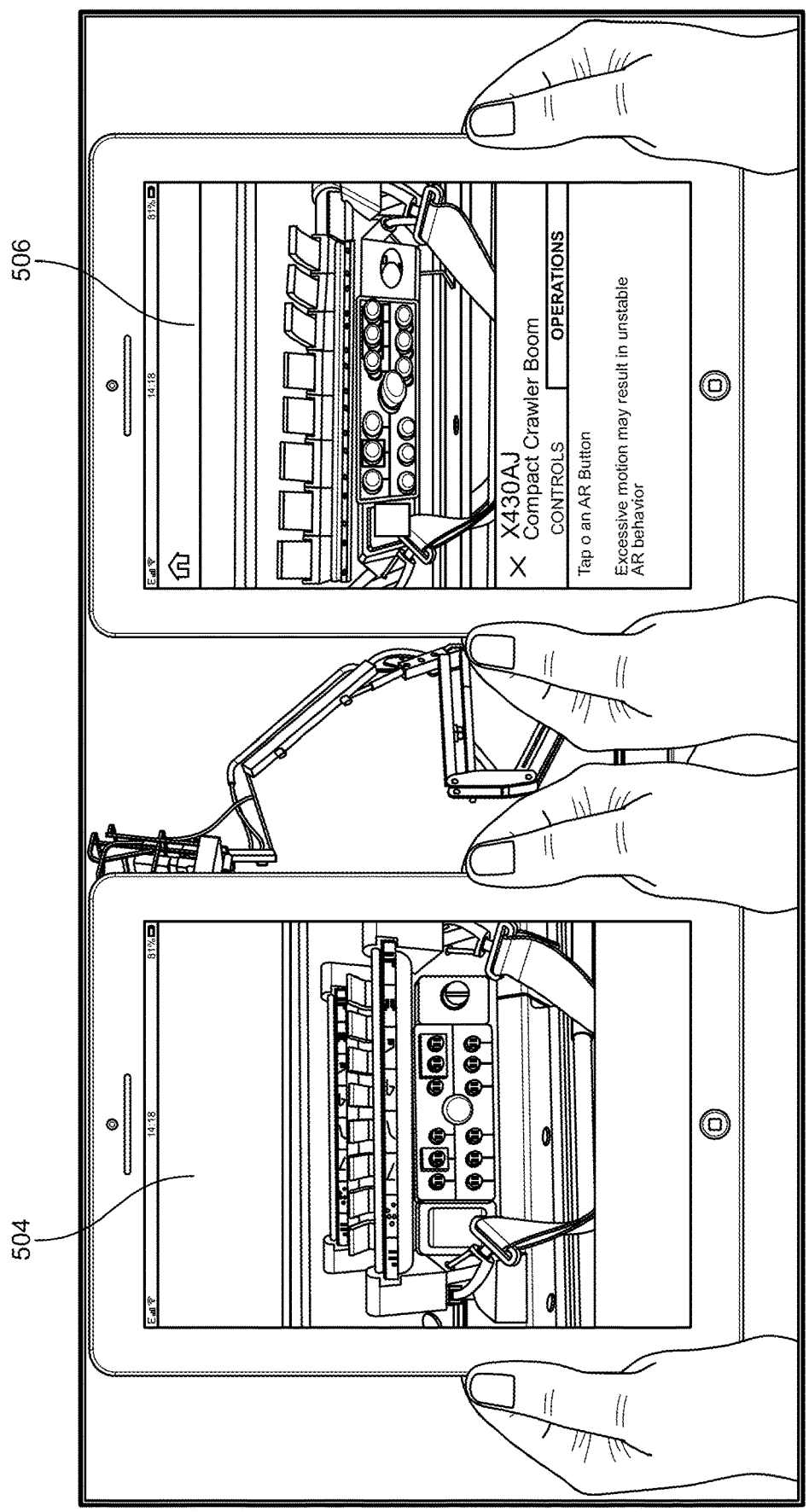

Referring specifically to FIG. 5A, interface 502 shows the control operation of a piece of heavy machinery. The application 114 may be configured to automatically detect the type of control equipment viewed in user device 104, associate it with stored equipment information, and display augmented reality data to the interface 502, as discussed below. Referring specifically to FIG. 5B, interface 504 shows a close-up of the controls used for operating a crawler boom equipment, and interface 502 shows the control equipment with a help window, that states, "Excessive motion may result in unstable AR behavior." In some embodiments, interface 506 can display warning messages or helpful pieces of information relating to the operation of the equipment.

Figure 5C:
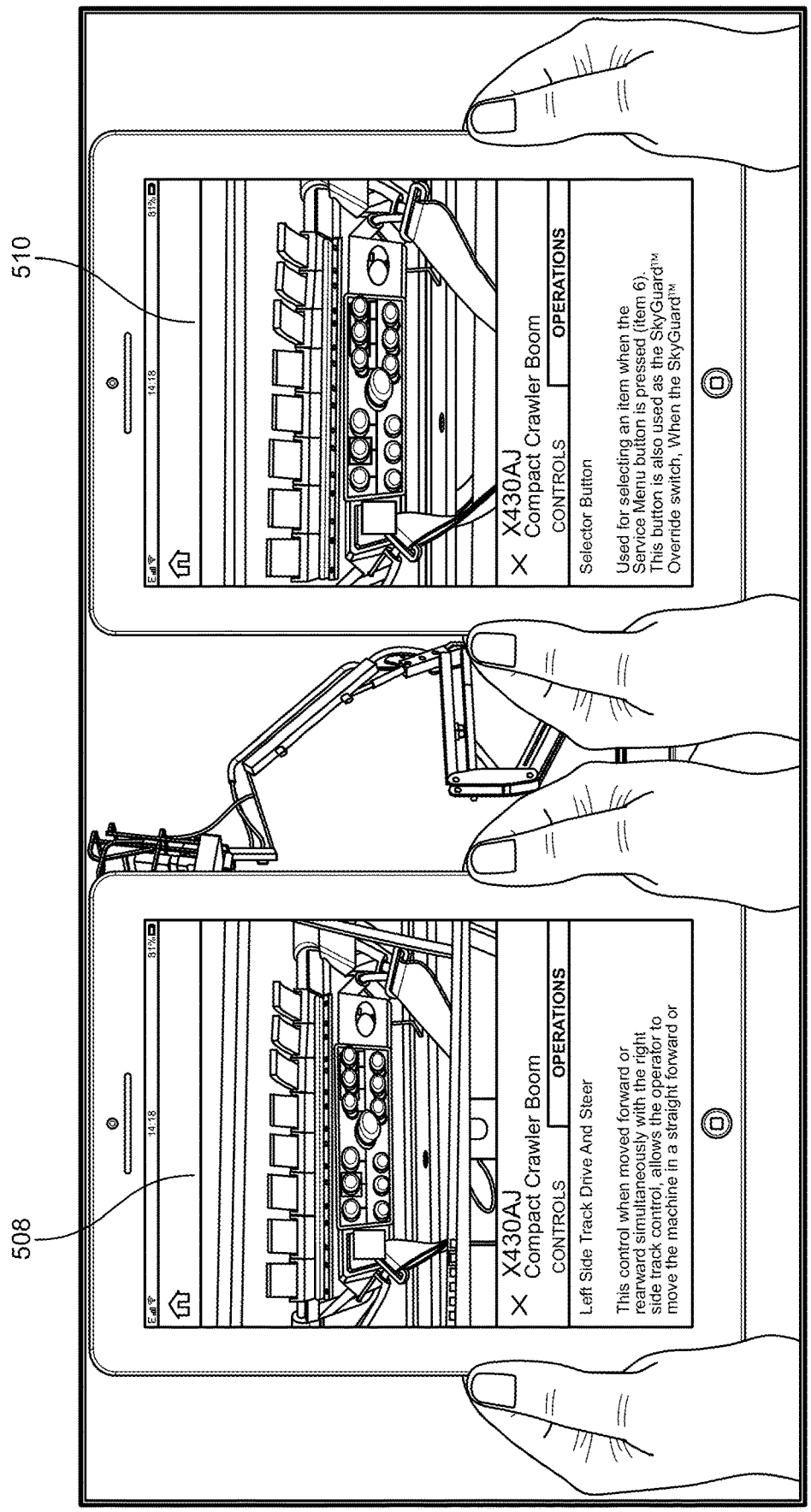

Referring specifically to FIG. 5C, interface 508 shows the control equipment for a compact crawler boom, along with a help window. In some embodiments, the help window has been generated automatically in response to application 114 processing the type of control equipment picked up via the camera within user device 104. The help window states, "This control when moved forward or rearward simultaneously with the right side track control, allows the operator to move the machine in a straight forward or . . . " The help window provides instructions and/or assistance for operation of the machinery automatically. In some embodiments, application 114 can display safety information and installation tips. In some embodiments, the help window can provide live-updates regarding the equipment. For example, a recall occurs on a part that is installed on the compact crawler boom as shown in interface 508. The help window subsequently displays, "Notice: It has been detected that part A has been recalled for this machine. Please refrain from operating the equipment until further notice." FIG. 5C shows another interface 510 is shown with a window. The window states, "Used for selecting an item when the Service Menu button is pressed (item 6). This button is also used . . . " In some embodiments, the help window can indicate what certain parts or pieces of equipment are used for and instructions on how to operate them.

Figure 5D:
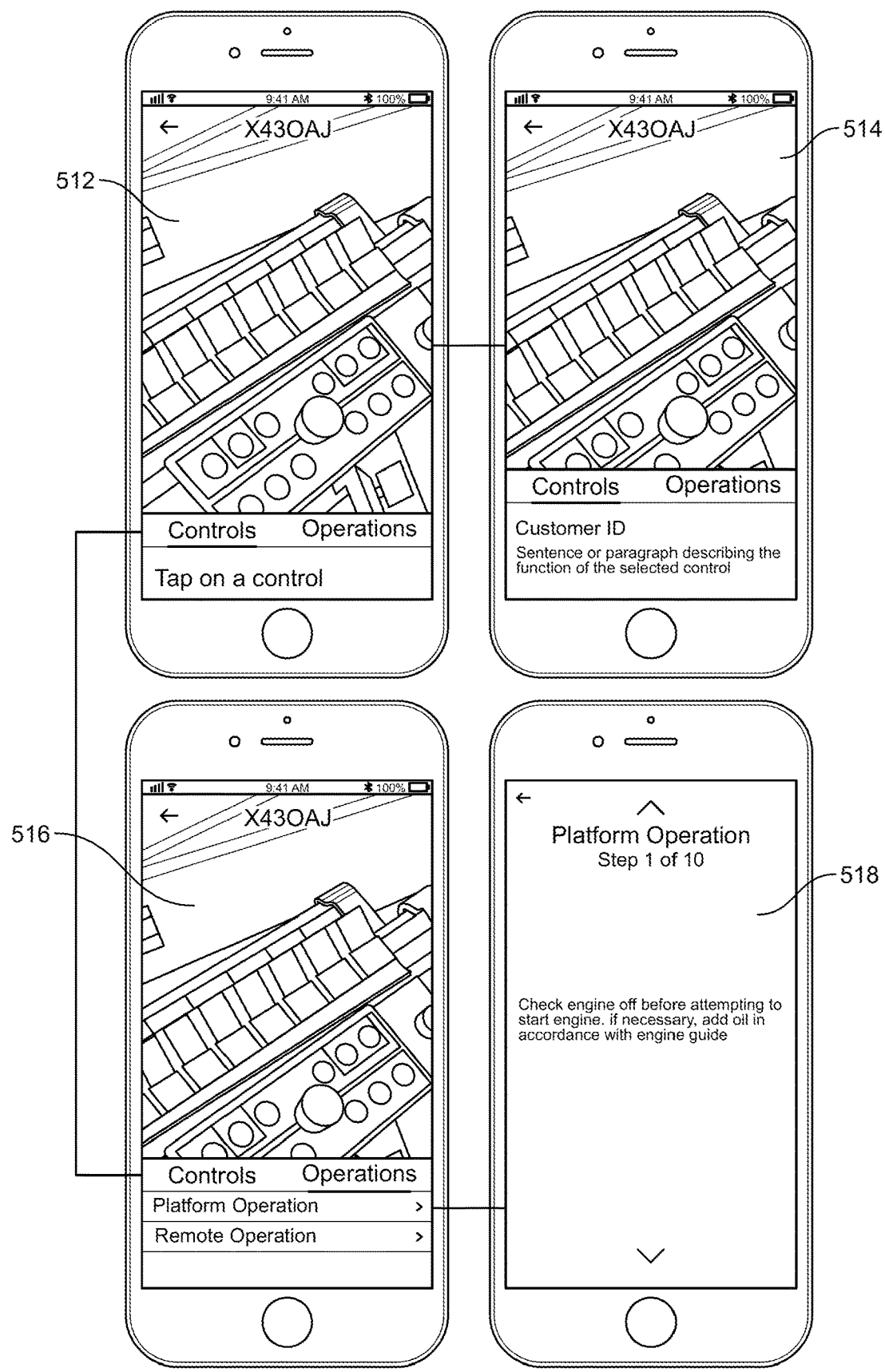

Referring now to FIG. 5D, interfaces 512-518 are shown, according to some embodiments. Interfaces 512-518 show several different types of help windows, useful information for operation of equipment, and other pieces of information that may benefit the operator of the heavy machinery.

Figure 6:
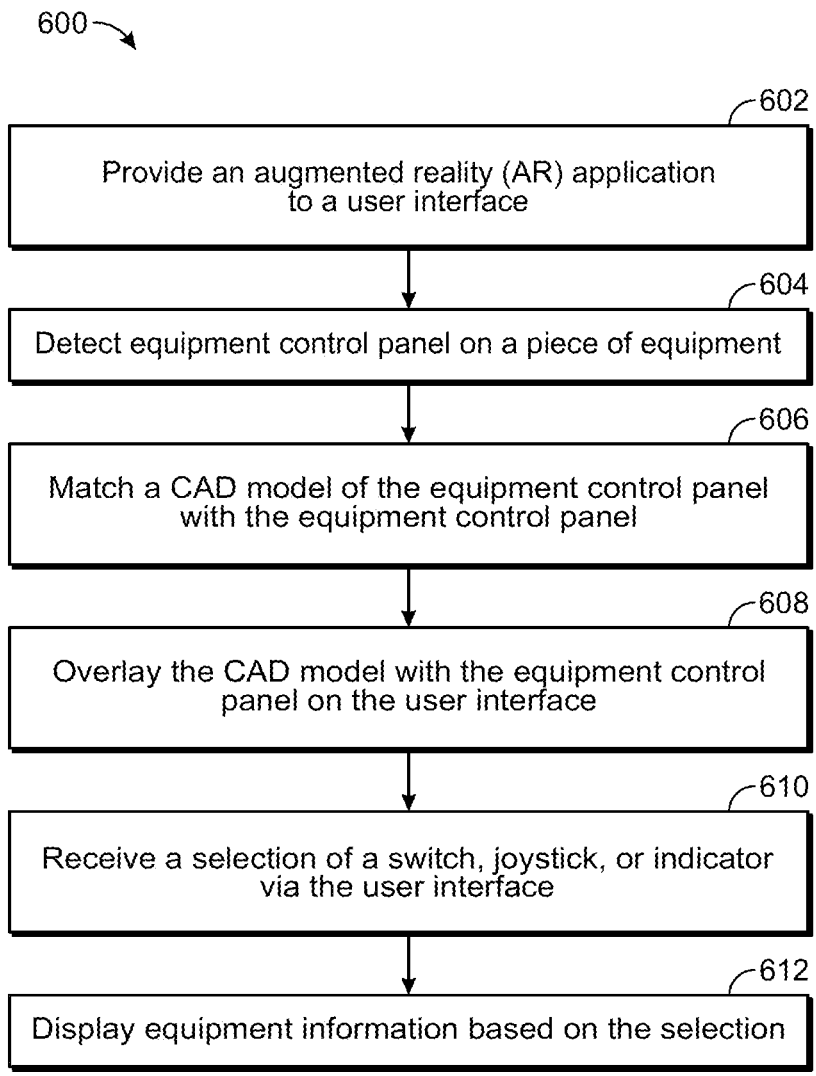
FIG. 6 is a flow diagram of a process for performing an operation process, which may be performed by the application as shown in FIG. 2, according to an exemplary embodiment.

Referring now to FIG. 6, a process 600 for guiding operation of equipment using AR is shown, according to an exemplary embodiment. Process 600 may be implemented by application 114 within server 112. Process 600 is shown to include providing an augmented reality application to a user interface (step 602). In an exemplary embodiment, user device 104 displays application 114 which may be an application that provides augmented reality functionality. Application 114 may be provided to an interface of user device 104 via instructions from user 102, such as clicking on an application icon on user device 104.

Process 600 is shown to include detecting an equipment control panel on a piece of equipment (step 604). As described herein, an equipment control panel may be any means of control (e.g., controller, equipment panel, etc.), capable of performing control capabilities for a piece of equipment. Application 114 may detect an equipment control panel of an AR-compatible equipment 106, when user films real world 116 via application 114. For example, application 114 may recognize a model number of the equipment control panel and query equipment database 110 for the matching equipment information. In other embodiments, application 114 may recognize the physical structure (e.g., dimensions, size, etc.) of the equipment control panel to determine the type/model of the equipment control panel and query equipment database 110 for the matching equipment information.

Process 600 is shown to include matching CAD model with equipment control panel (step 606) and overlaying the CAD model with the equipment control panel on the user interface (step 608). Once application 114 receives the matching equipment information, the equipment information may include one or more CAD models. Application 114 may provide the CAD model of the detected piece of equipment as an overlay on top of the actual piece of equipment in real world 116. In an exemplary embodiment, the overlaid CAD model may appear as a lightly colored (e.g., light-blue, etc.) transparent square of the same dimensions as the equipment control panel.

Process 600 is shown to include receiving a selection of a switch, joystick, or indicator via the user interface (step 610) and displaying equipment information based on the selection (step 612). Once user 102 is able to view the overlaid CAD model on top of the equipment control panel, user 102 may click on various parts of the CAD model, such as the virtual switch, joystick, or indicator of the virtual equipment control panel. For example, user 102 clicks on a switch on the virtual equipment control panel via user device 104. Application 114 receives the selection and provides the user with detailed information relating to the selected switch, such as the functionality of the switch, how to operate the switch, etc.

In an exemplary embodiment, process 600 may further include a step for guiding user 102 to prepare the machine for operation. This may include using virtual guides and/or signals to guide user 102 throughout the process, such as the guides shown with reference to FIGS. 5A-D. Process 600 may be performed in 20 languages or more and may be configured for a variety of equipment (e.g., boom lifts, scissor lifts, vertical lifts, etc.). Operation module 212 may be capable of performing process 600 for up to, but not limited to, 10 configurations, but may include capability for control panel information for other equipment types/models to be incorporated in the future.

Figure 7A:
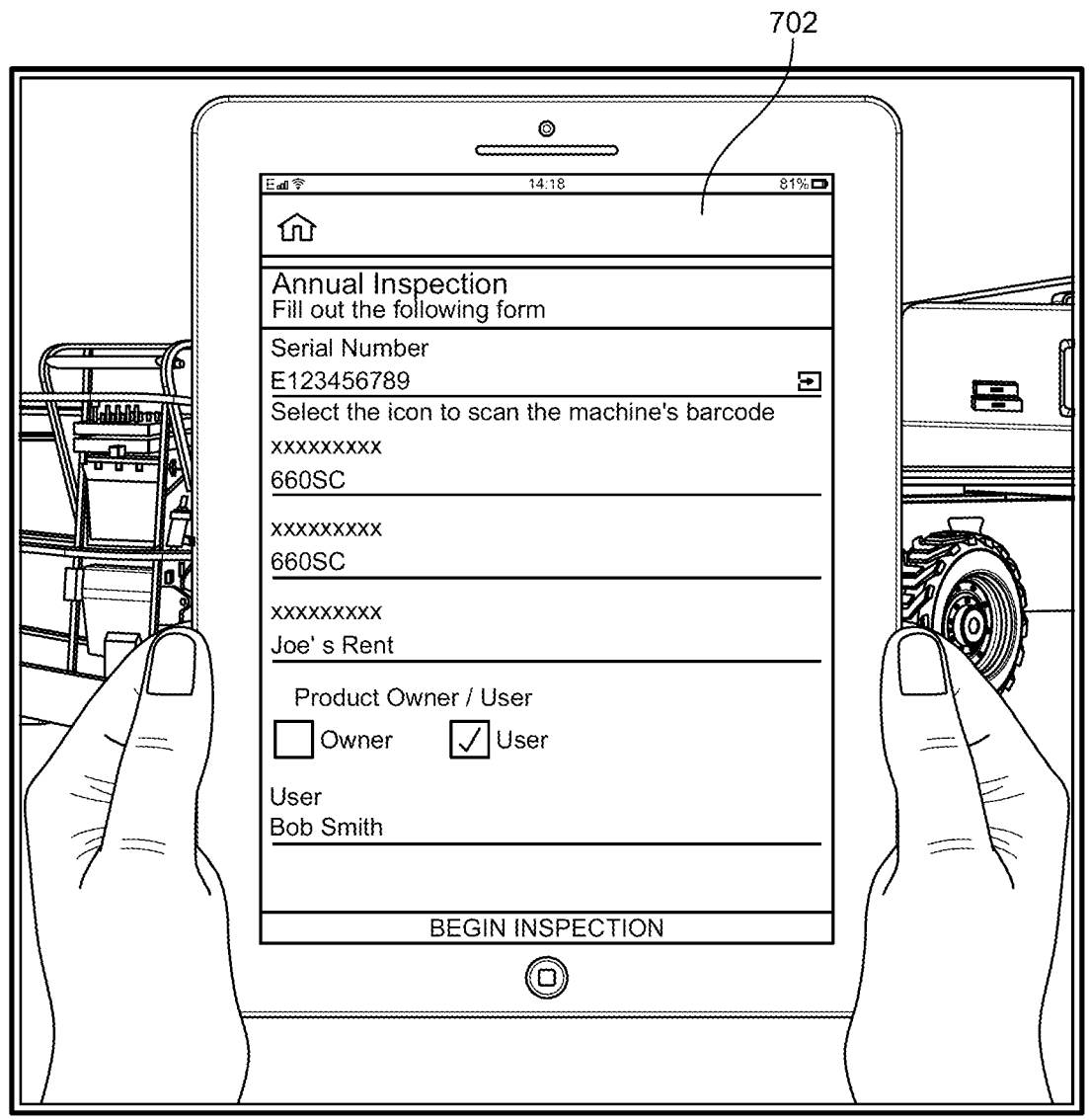
FIGS. 7A-E are graphical user interfaces of the application of FIG. 2, according to exemplary embodiments.
Figure 7B:
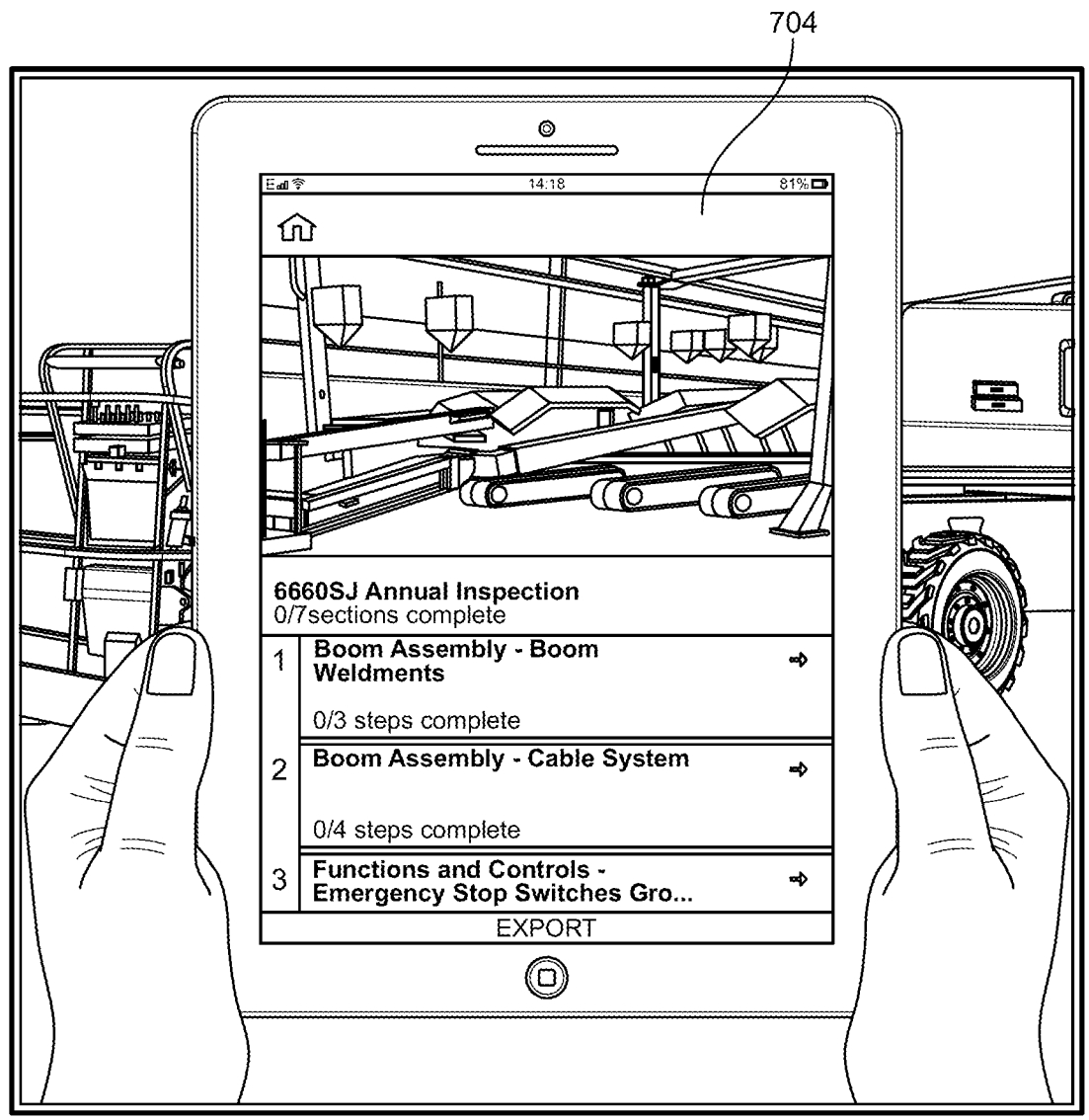
Figure 7C:
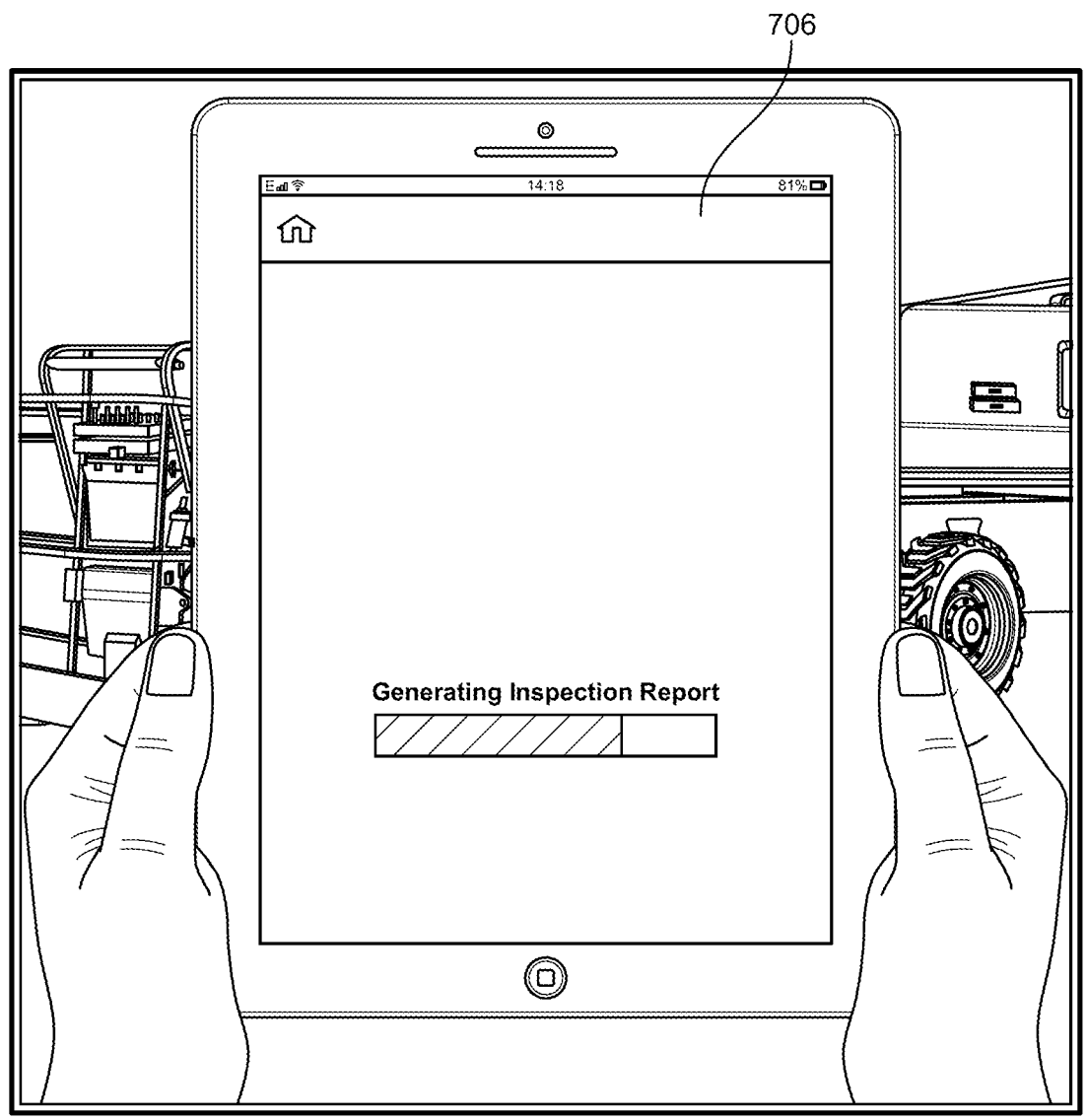
Figure 7D:
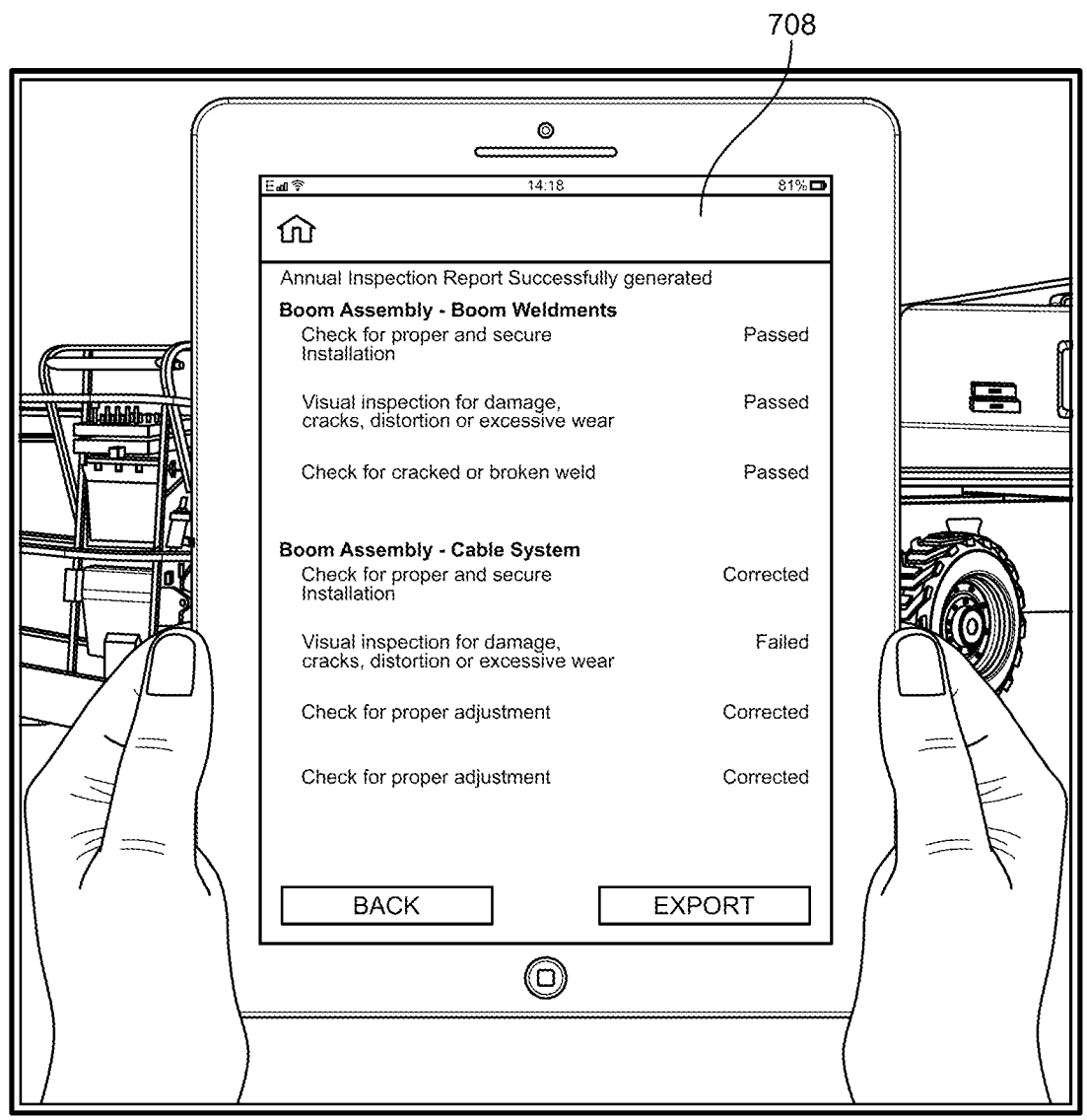

Referring now to FIGS. 7A-E, various embodiments of different interfaces are shown, according to exemplary embodiments. FIGS. 7A-E may be configured to show various steps through a process (e.g., process 800, etc.) for implementing annual inspection module 214 on user device 104. Referring specifically to FIG. 7A, interface 702 is shown to include inspection information for a product of piece of equipment. In FIG. 7B, interface 704 is shown to include additional information relating to an inspection, the interface 704 shows multiple steps for checking the operation of the equipment (e.g., Boom Weldments, Cable System, etc.) shown in sequential order. In FIG. 7C, interface 706 shows application 114 generating the inspection report. In FIG. 7D, interface 708 shows the generated inspection report based on the testing performed as shown in interfaces 702-704.

Figure 7E:
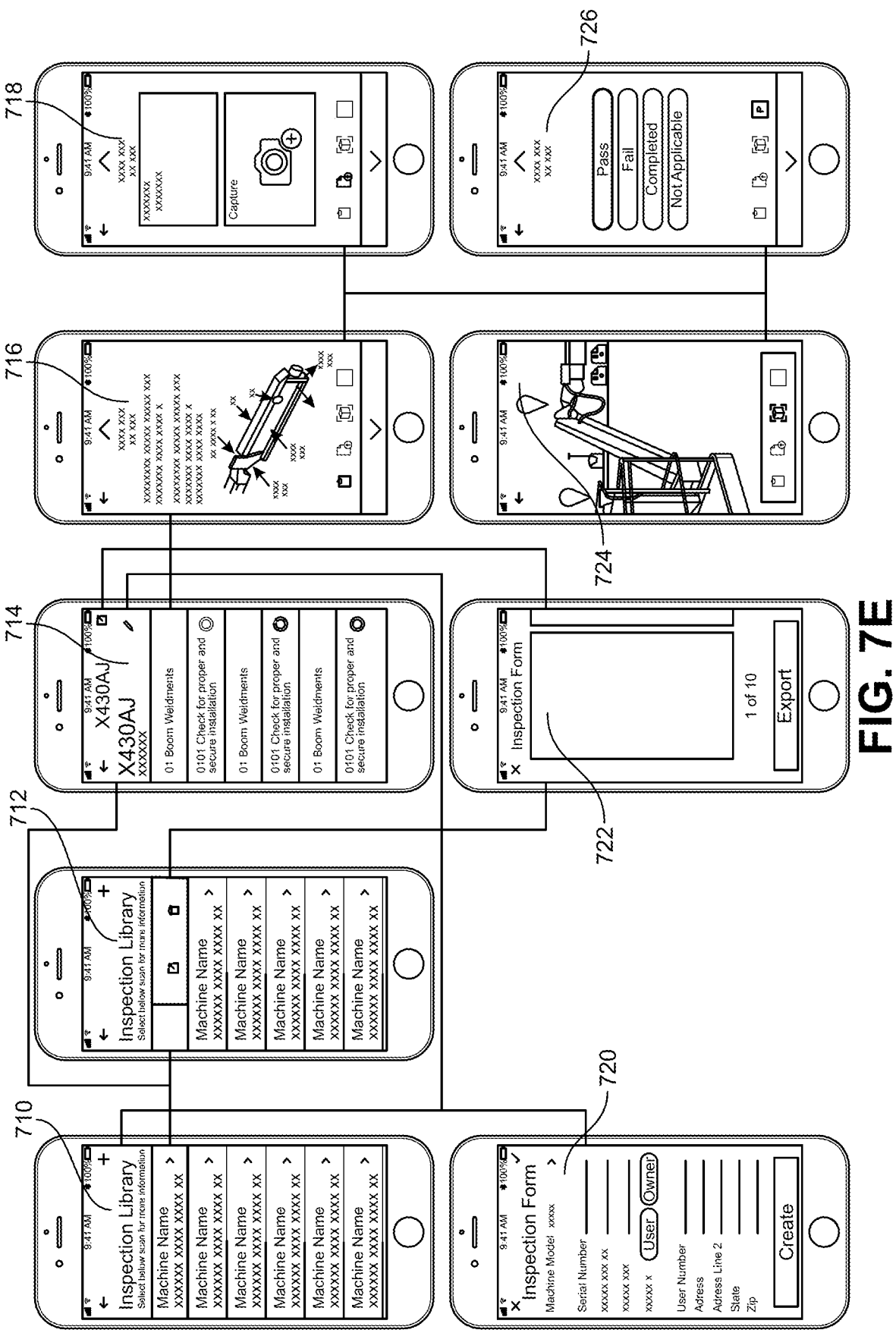

Referring now to FIG. 7E, several interfaces (e.g., interface 710, interface 712, interface 714, interface 716, interface 718, interface 720, interface 722, interface 724, and interface 726) are shown to display inspection library information and other inspection information. Particularly, interface 726 shows a widget for determining whether the product passed inspection, failed inspection, completed inspection, or if it is not applicable.

Figure 8:
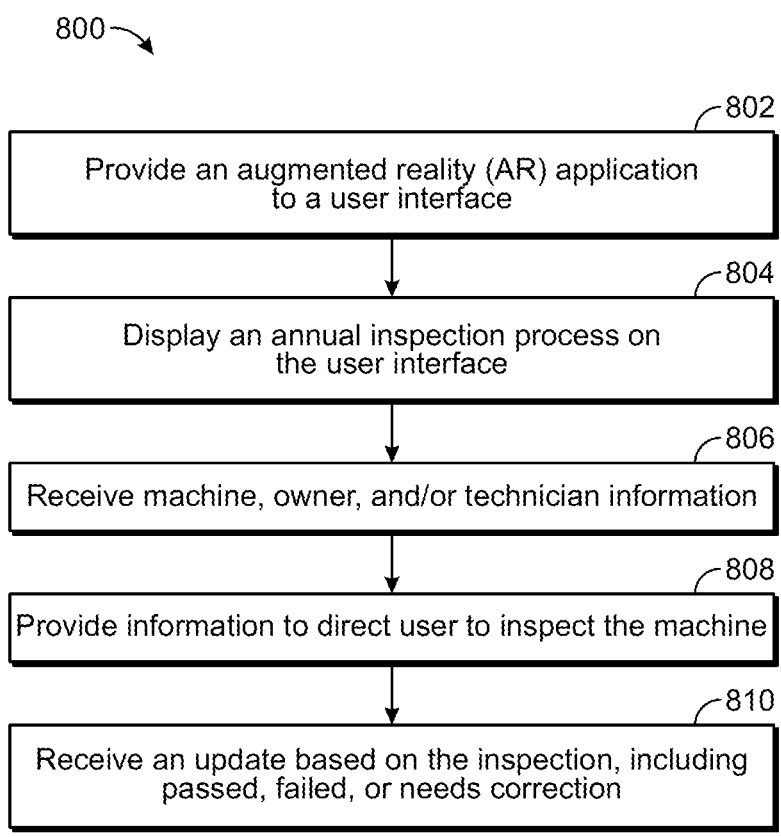
FIG. 8 is a flow diagram of a process for performing inspections of equipment, which may be performed by the application as shown in FIG. 2, according to an exemplary embodiment.

Referring now to FIG. 8, a process 800 for inspecting equipment using AR is shown, according to an exemplary embodiment. Process 800 may be implemented by application 114 within server 112. Process 800 is shown to include providing an augmented reality application to a user interface (802). In an exemplary embodiment, user device 104 displays application 114 which may be an application that provides augmented reality functionality. Application 114 may be provided to an interface of user device 104 via instructions from user 102, such as clicking on an application icon on user device 104.

Process 800 is shown to include displaying an annual inspection process on the user interface (step 804). In an exemplary embodiment, the annual inspection includes a series of steps that user 102 may perform to facilitate stable and reliable operation of a piece of equipment. These steps may include checking the tightness of bolts, greasing parts of the equipment, checking power/torque levels, and other various inspection steps.

Process 800 is shown to include receiving machine, owner, and/or technician information. In some embodiments, application 414 is provided the information necessary to determine the type of equipment/model that is to be inspected. This may include user 102 providing the model number, product number, or other information. User 102 may also provide other information for logging purposes, such that the application 114 can know who is inspecting which machine.

Figure 9A:
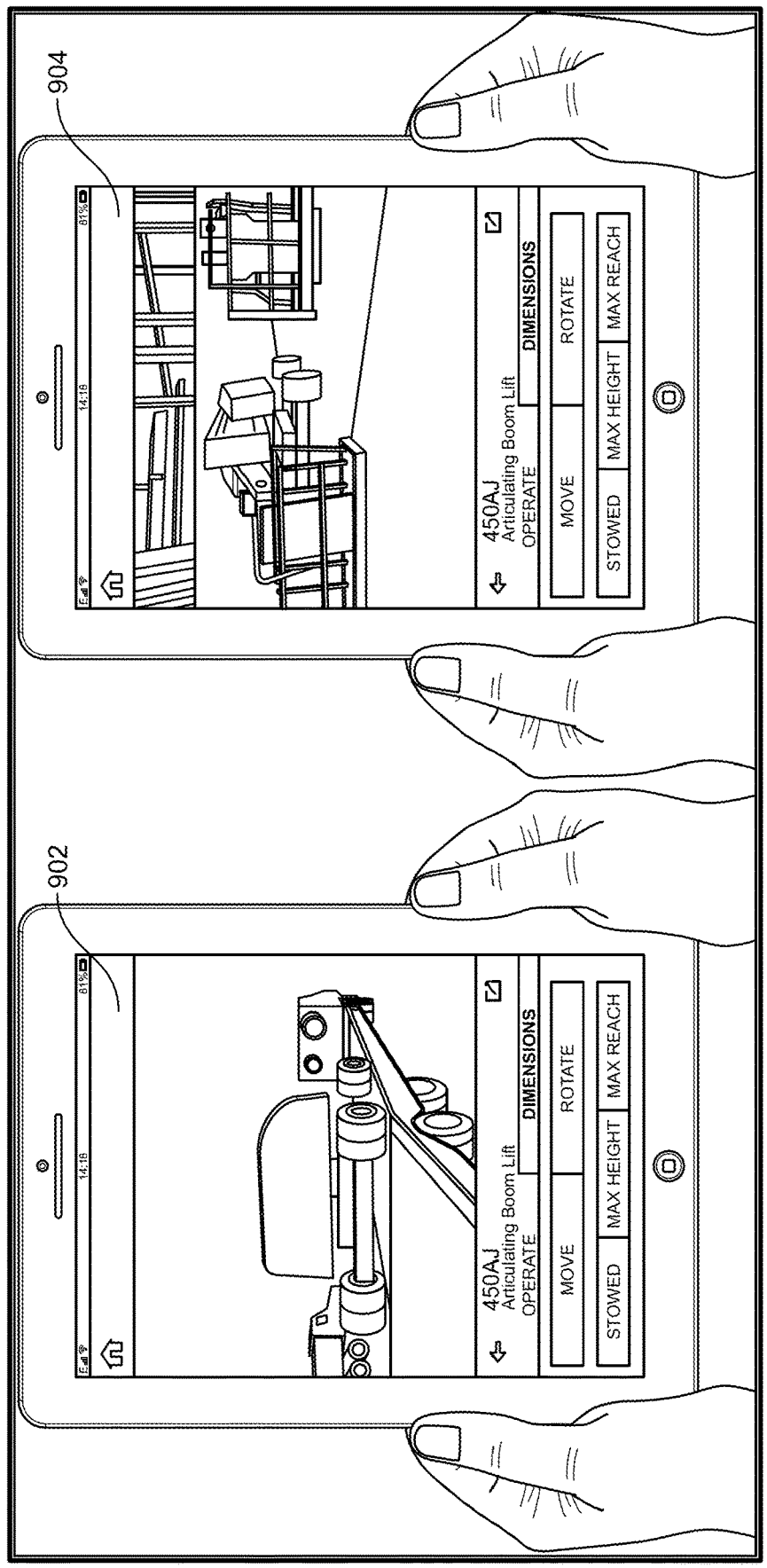
FIGS. 9A-C are graphical user interfaces of the application of FIG. 2, according to exemplary embodiments.
Figure 9B:
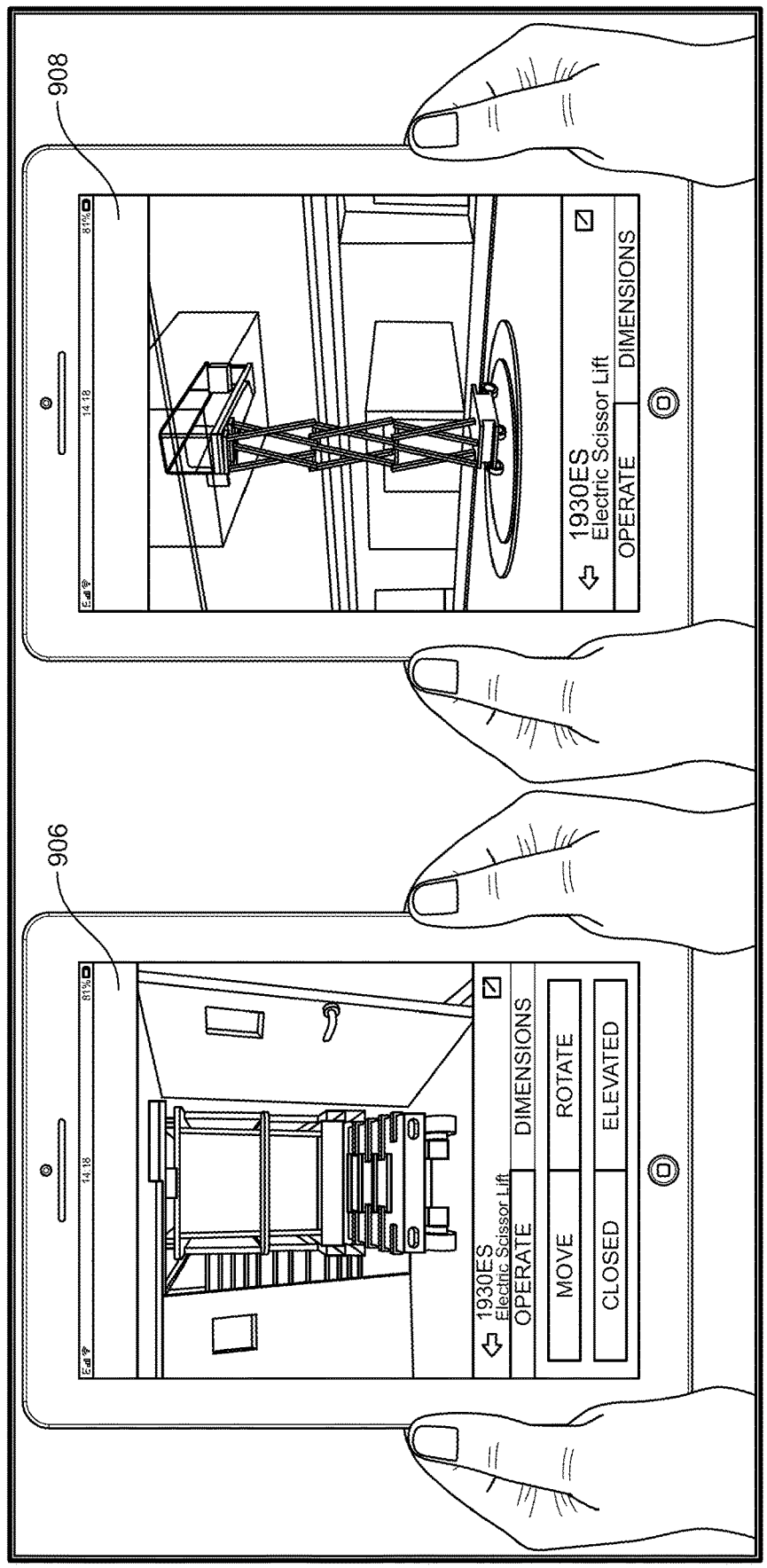
Figure 9C:
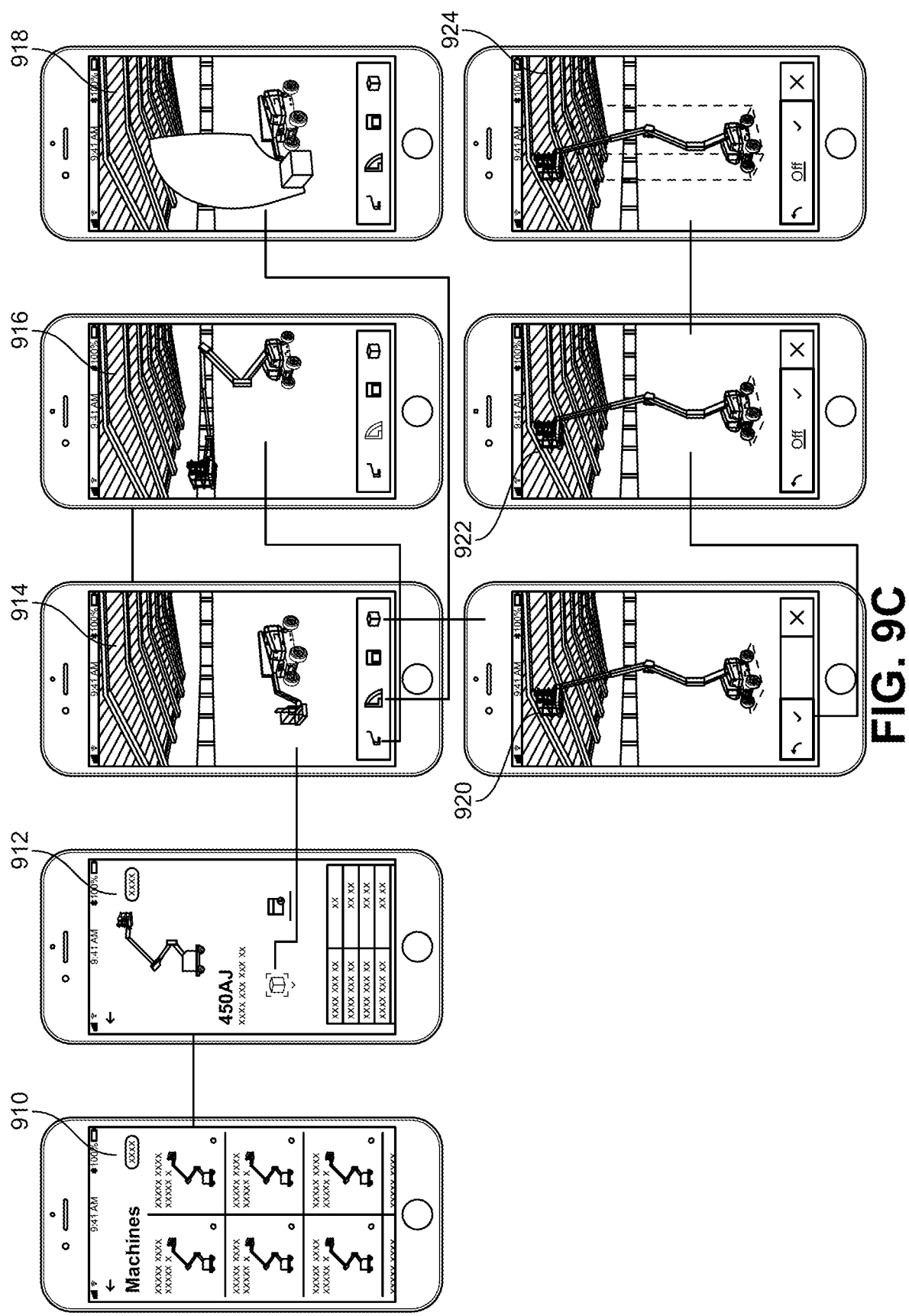

Process 800 is shown to include providing information to direct a user to inspect the equipment (step 808) and receiving an update based on the inspection, including passed, failed, or needs correction (step 810). Application 114 may process the received information from user 102 and direct them through a series of steps to inspect the machine. Upon completion of the step, user 102 may indicate via application 114 that the step has been completed. If the Referring now to FIGS. 9A-C, various embodiments of interface (e.g., interfaces 902, interface 904, interface 906, interface 908, and interfaces 910-924) are shown, according to exemplary embodiments. FIGS. 9A-C may be configured to show various steps through a process (e.g., process 1000, etc.) for implementing annual inspection module 216 on user device 104.

Referring specifically to FIG. 9A, interfaces 902 and 904 show an articulating boom lift being overlaid in the physical word. The articulating boom lift shown within interface 902 is a virtual representation of a physical boom lift. In some embodiments, the virtual equipment can be adjusted, raised, stowed, rotated, moved, and otherwise manipulated virtually, while it overlaid in the real world via the camera in user device 104. This is similarly shown in interfaces 906 and 908 of FIG. 9B, where an electric scissor lift is overlaid in the real word, and can be moved, closed, opened, rotated, elevated or otherwise manipulated virtually. Referring specifically to FIG. 9C, interfaces 910-924 display other examples of overlaying virtual machines or components within a physical world via a user device 104.

Figure 10:
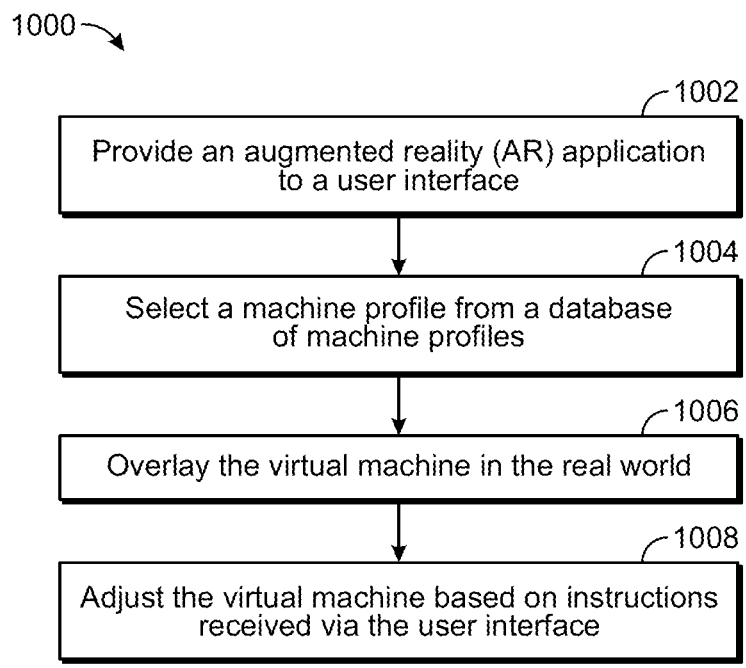
FIG. 10 is a flow diagram of a process for machine visualization, which may be performed by the application as shown in FIG. 2, according to an exemplary embodiment.
Figure 11A:
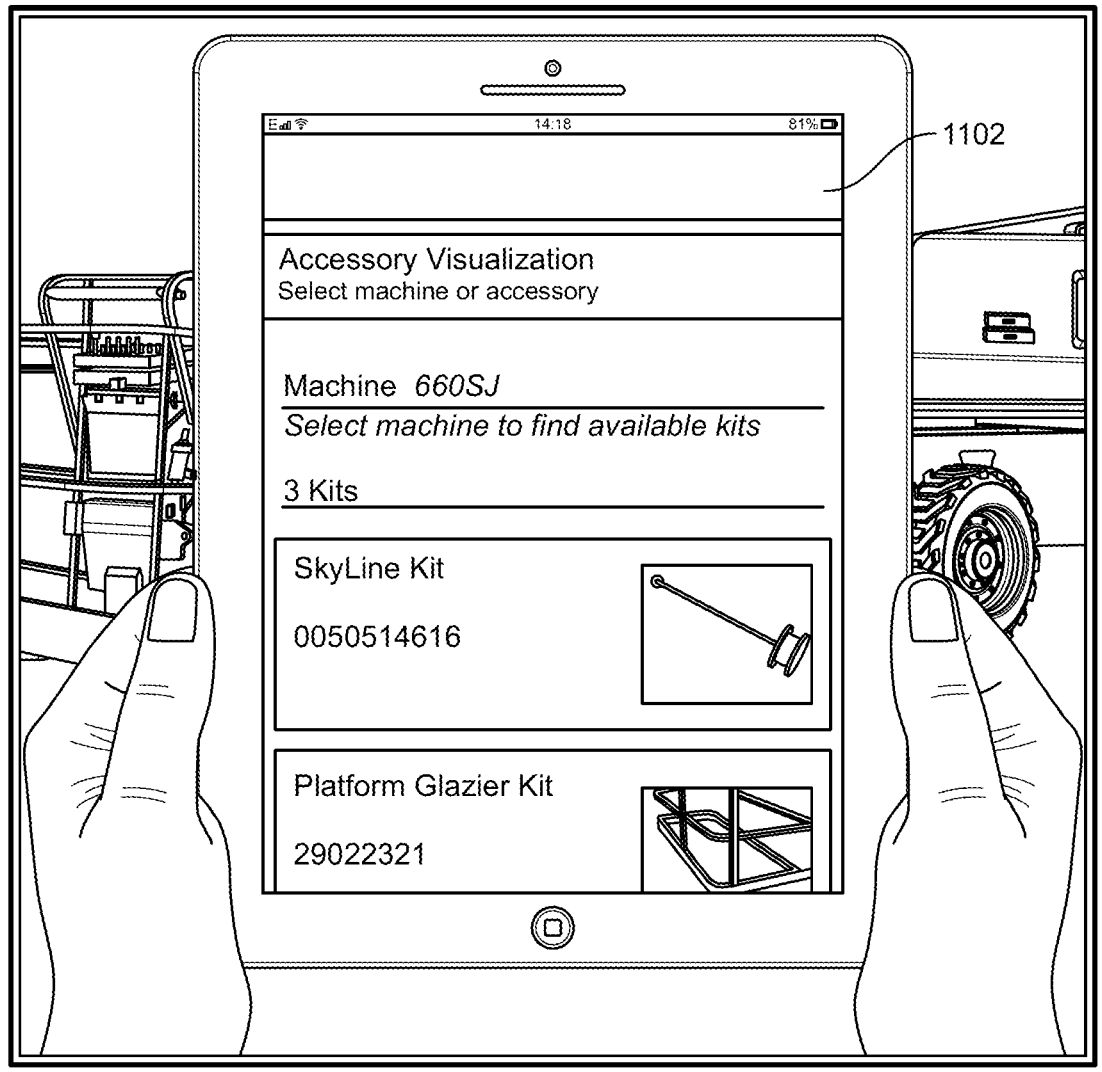
FIGS. 11A-D are graphical user interfaces of the application of FIG. 2, according to exemplary embodiments.
Figure 11B:
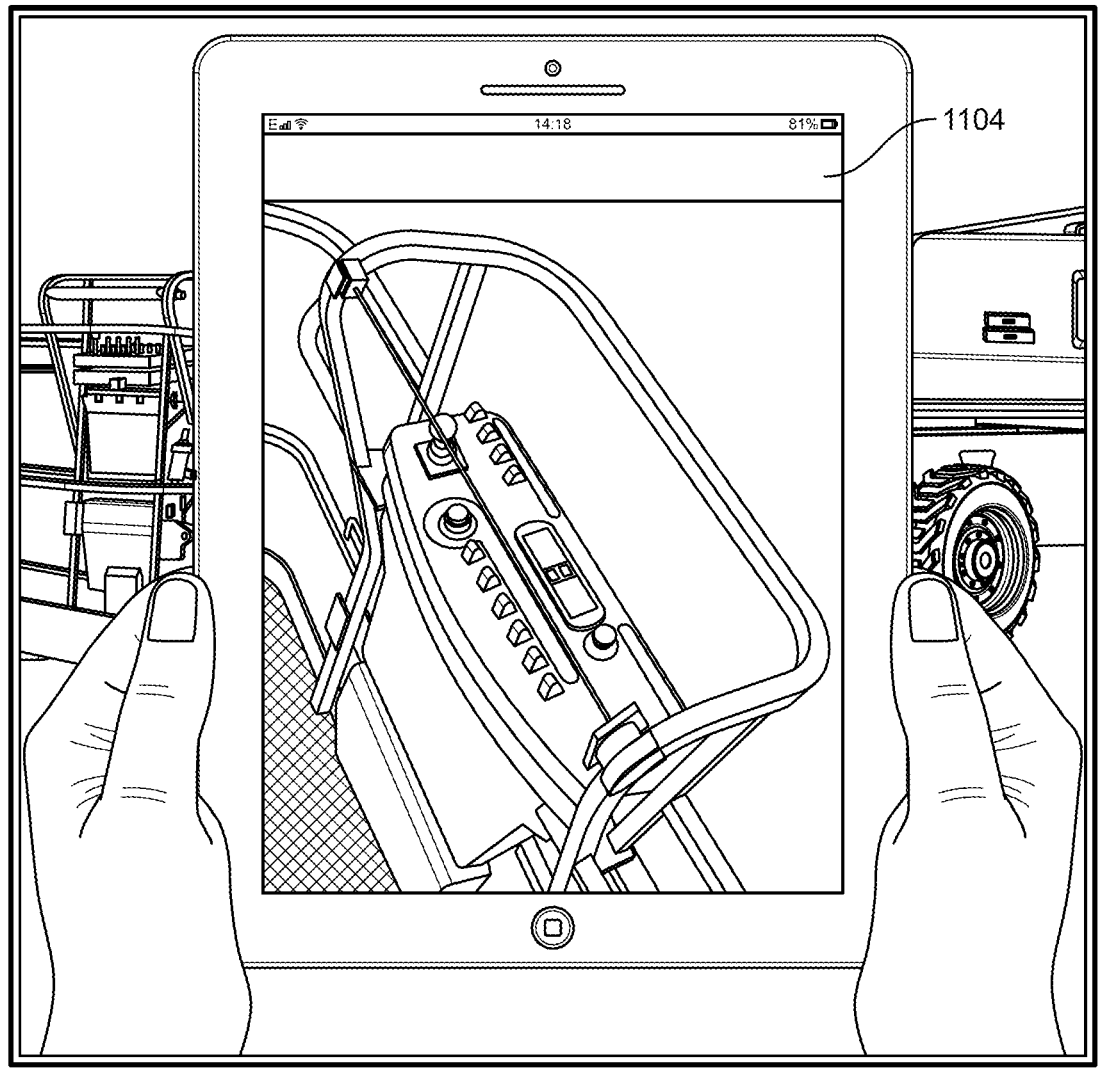
Figure 11C:
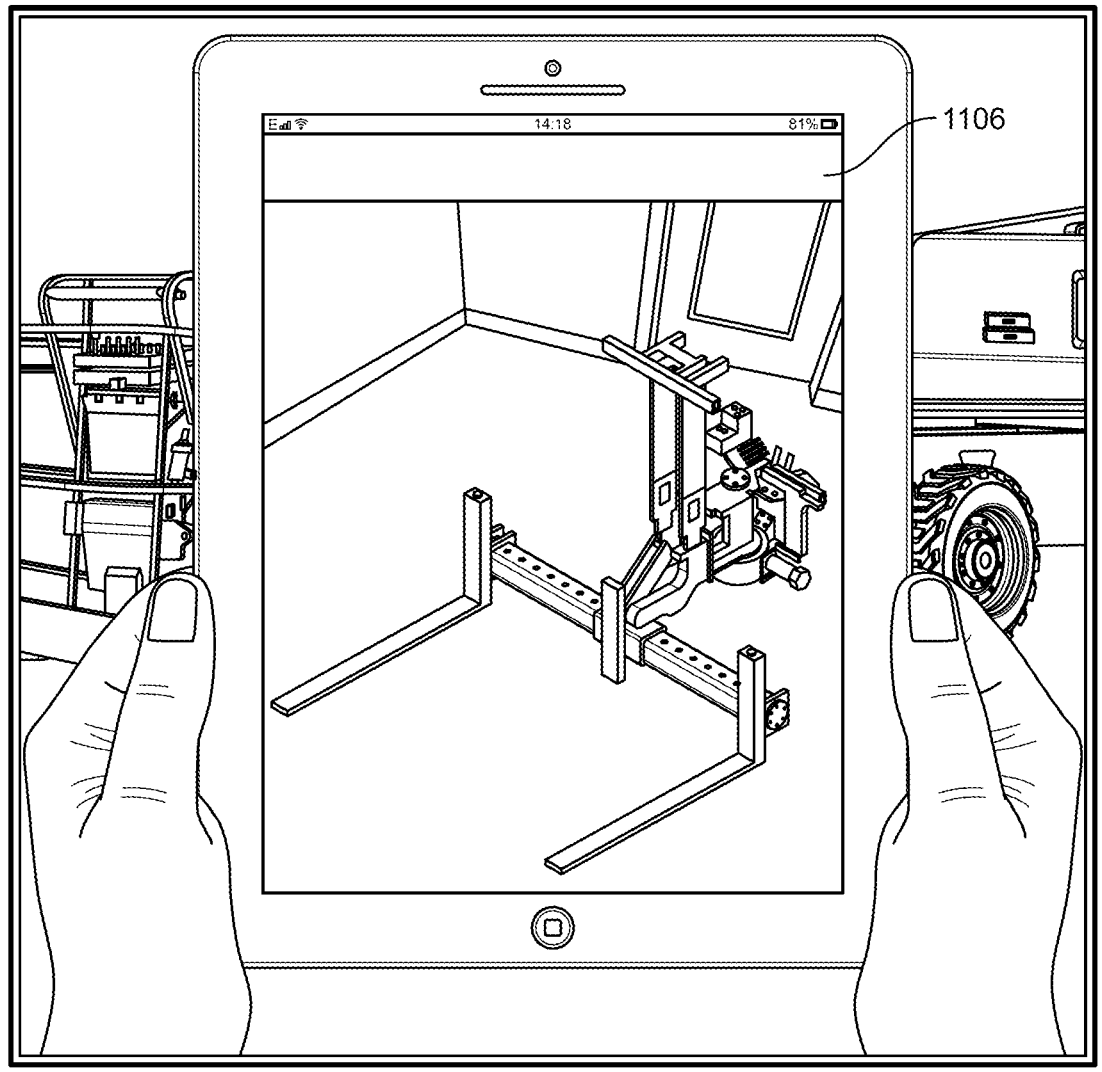
Figure 11D:
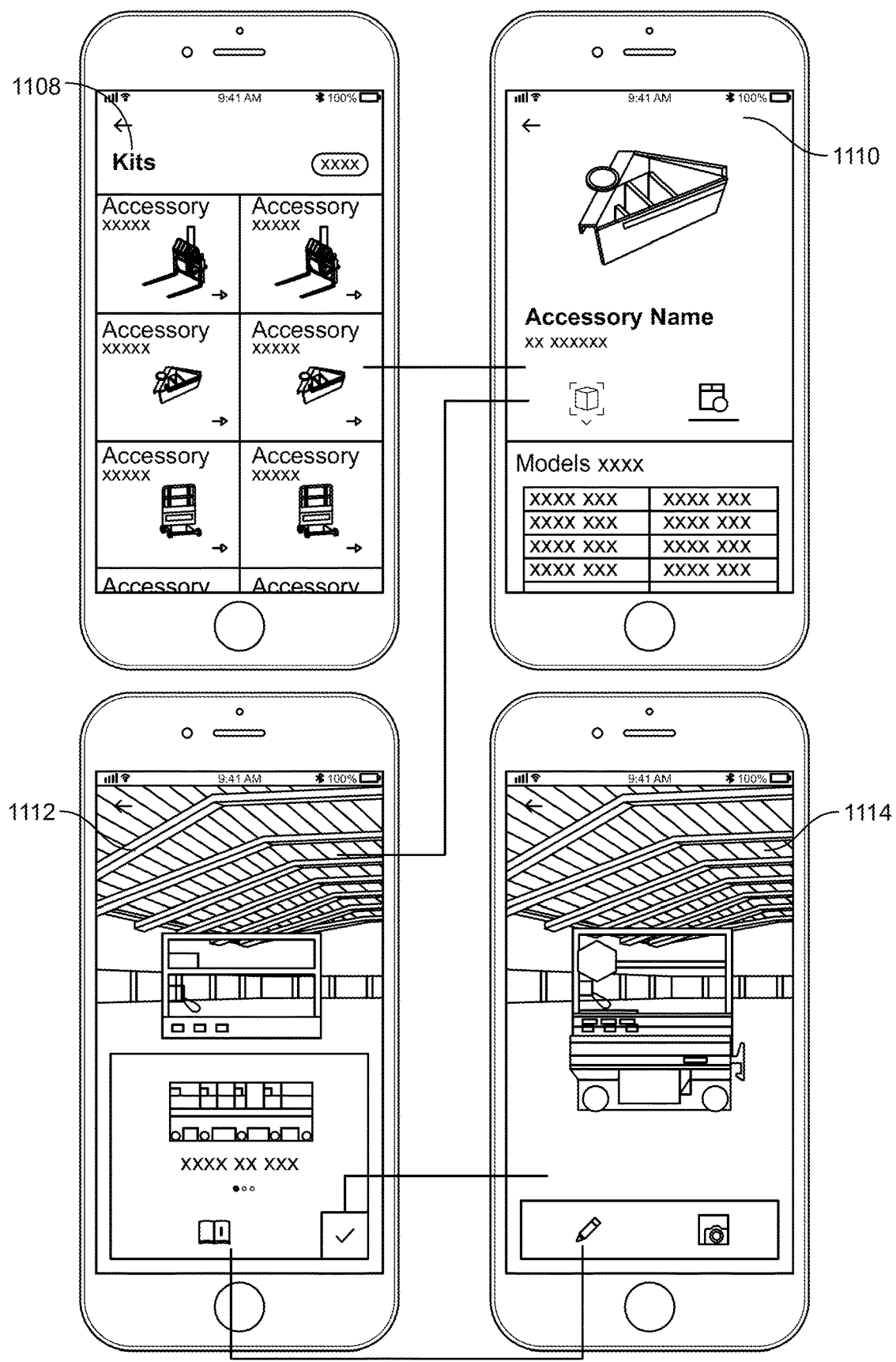

Referring now to FIG. 10, a process 1000 for visualizing machines in AR is shown, according to an exemplary embodiment. Process 1000 may be implemented by application 114 within server 112. Process 1000 is shown to include providing an augmented reality application to a user interface (step 1002). In an exemplary embodiment, user device 104 displays application 114 which may be an application that provides augmented reality functionality. Application 114 may be provided to an interface of user device 104 via instructions from user 102, such as clicking on an application icon on user device 104.

Process 1000 is shown to include selecting a machine profile from a database of machine profiles (step 1004). In an exemplary embodiment, equipment database 110 includes several machine (e.g., pieces of equipment, etc.) profiles. These profiles may include information relating to the machines that indicate their physical structure, design, or operational parameters. For example, equipment database 110 includes a profile for boom lift model A1 that includes the dimensions of the boom lift, operational parameters (e.g., current draw, required operational voltage, torque output, maximum lift height, etc.), and lift capabilities (e.g., how far the lift can reach, etc.). Machine visualization module 216 may be configured to process this equipment information and generate a virtual model that may be displayed on a user interface through application 114 via AR.

Process 1000 is shown to include overlaying the virtual machine in the real world (step 1006). In some embodiments, application 104 may provide the virtual machine to user device 104 via AR. In an exemplary embodiment, the virtual machine may resemble the physical structure of the actual machine for viewing purposes.

Process 1000 is shown to include adjusting the virtual machine based on instructions received via the user interface (step 1008). Once application 114 displays the virtual machine on the interface of user device 104, user 102 may be able to walk around the virtual machine and observe the machine from different perspectives. Additionally, user 102 may provide instructions to adjust the virtual machine via user device 104, such as extending the lift of the virtual machine. User 102 may be able to provide adjustments to the virtual machine for further observation purposes.

Referring now to FIGS. 11A-D, various embodiments of interfaces (e.g., interfaces 1102, 1104, 1106, 1108, and 1110) are shown, according to exemplary embodiments. FIGS. 11A-D may be configured to show various steps through a process (e.g., process 1200, etc.) for implementing annual inspection module 218 on user device 104.

Figure 12:
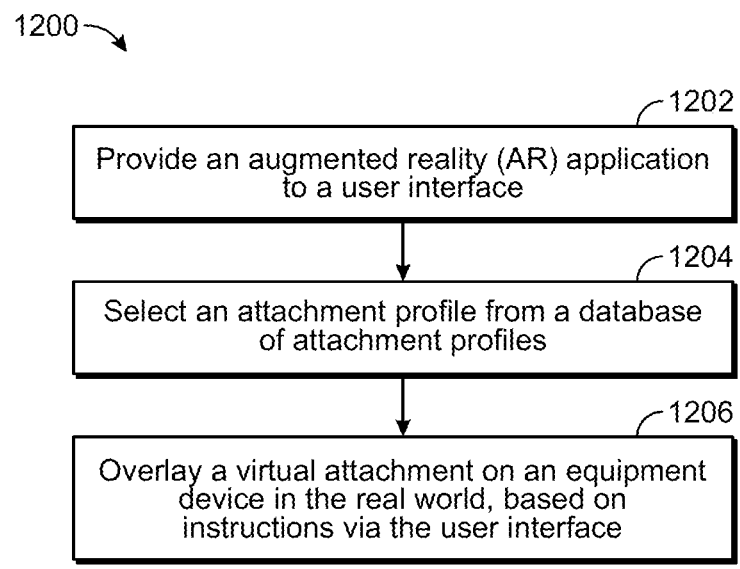
FIG. 12 is a flow diagram of a process for attachment visualization, which may be performed by the application as shown in FIG. 2 according to an exemplary embodiment.
Figure 13A:
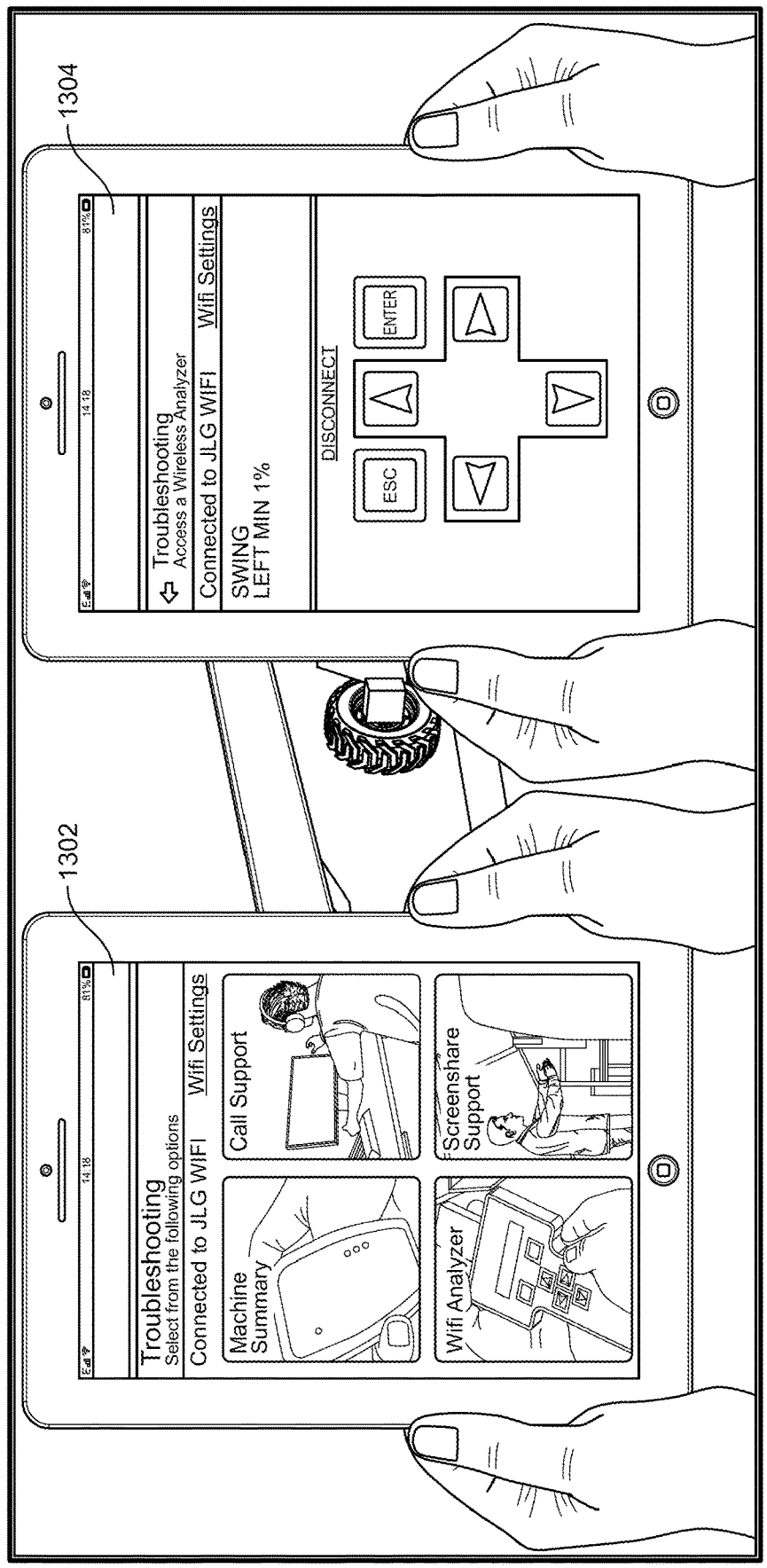
FIGS. 13A-I are graphical user interfaces of the application of FIG. 2, according to exemplary embodiments.
Figure 13B:
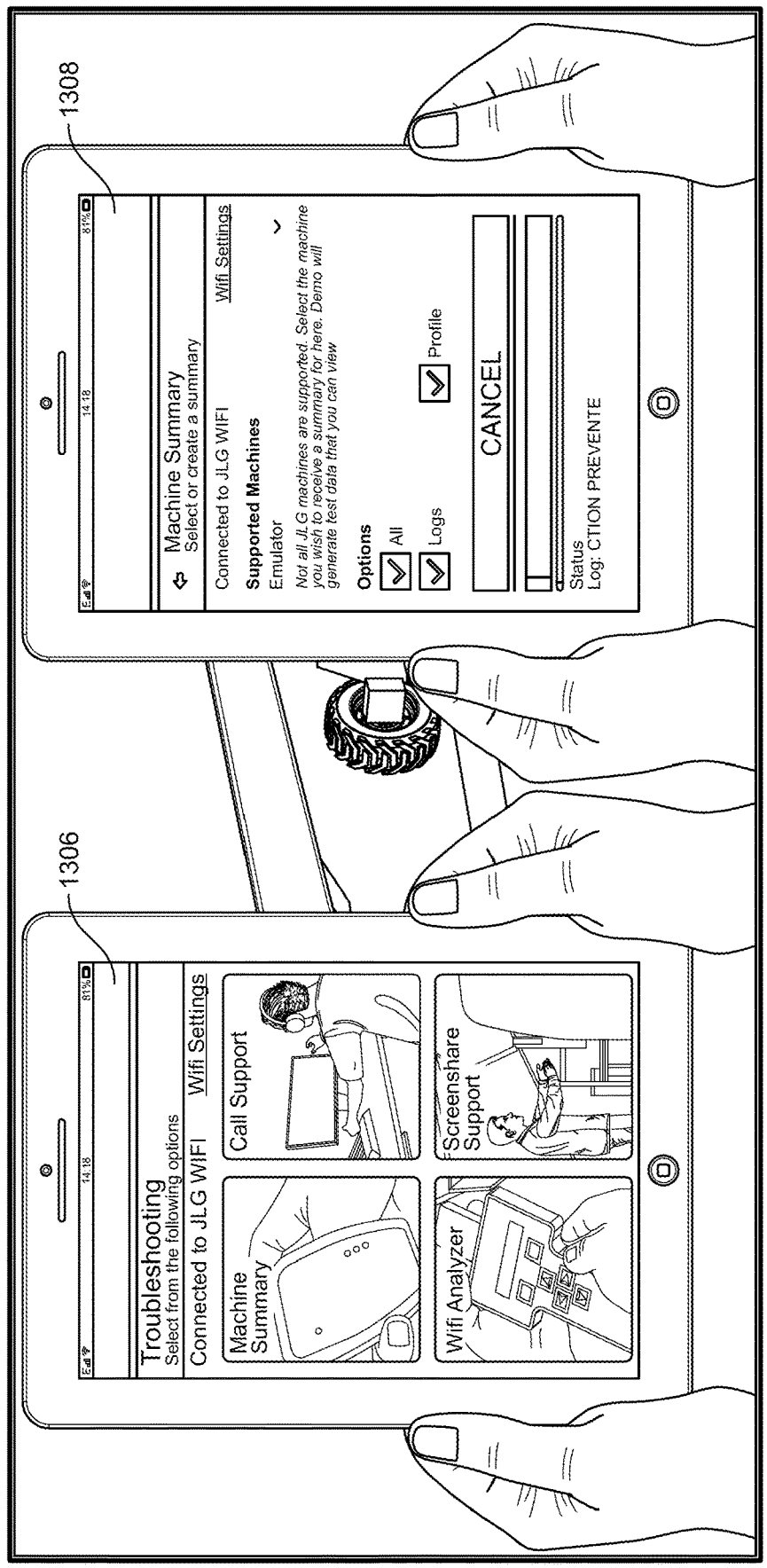
Figure 13C:
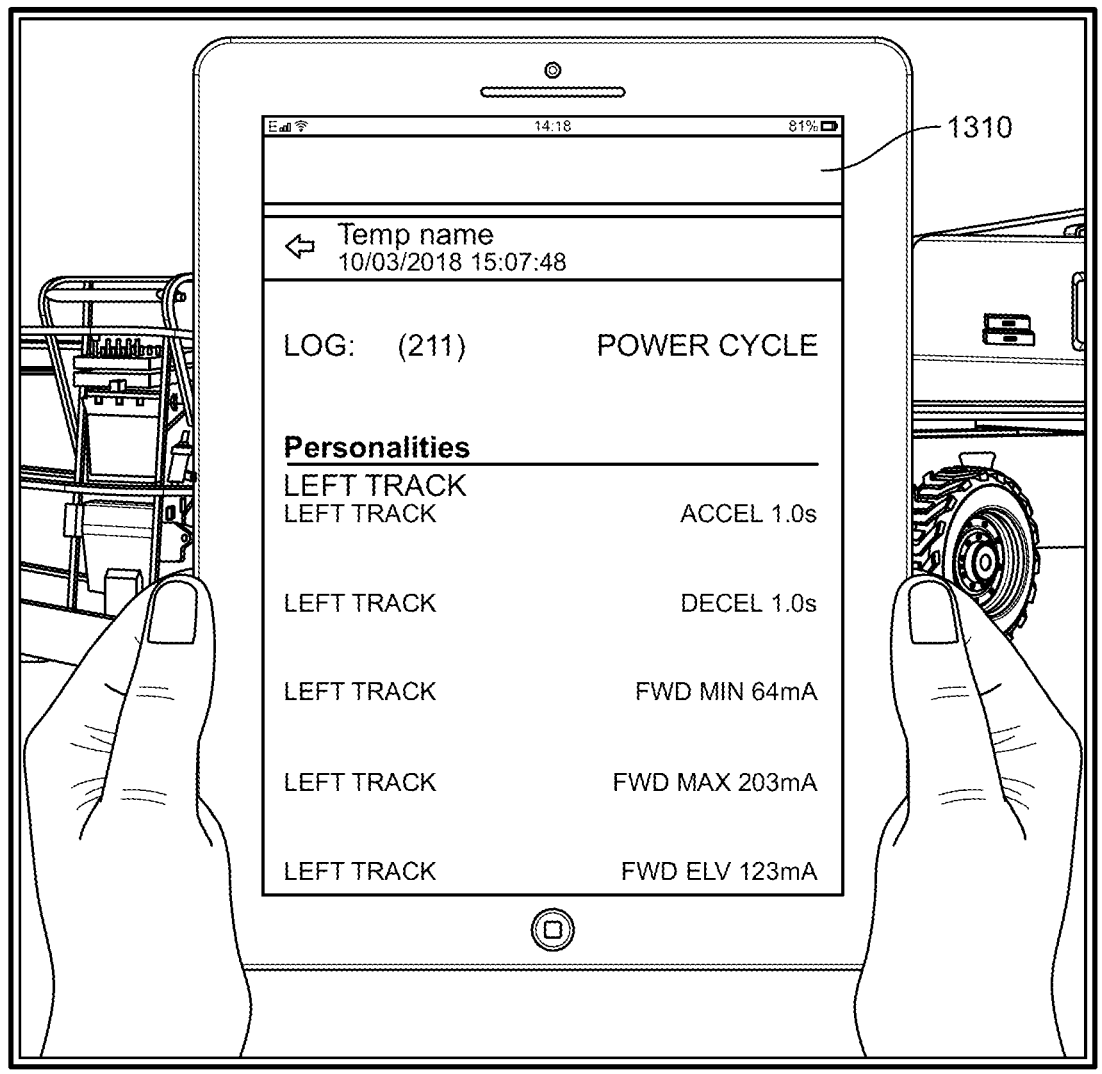
Figure 13D:
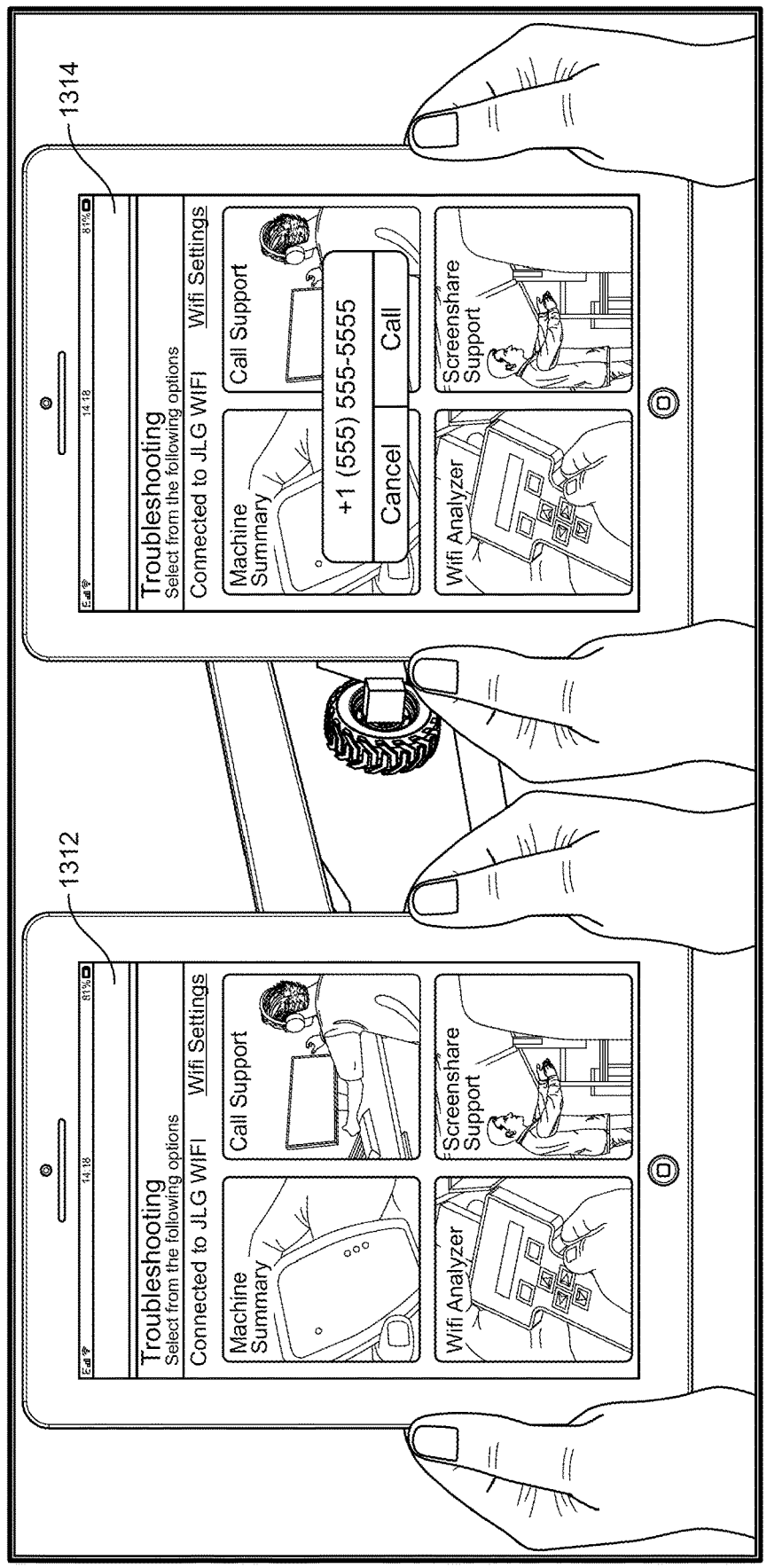
Figure 13E:
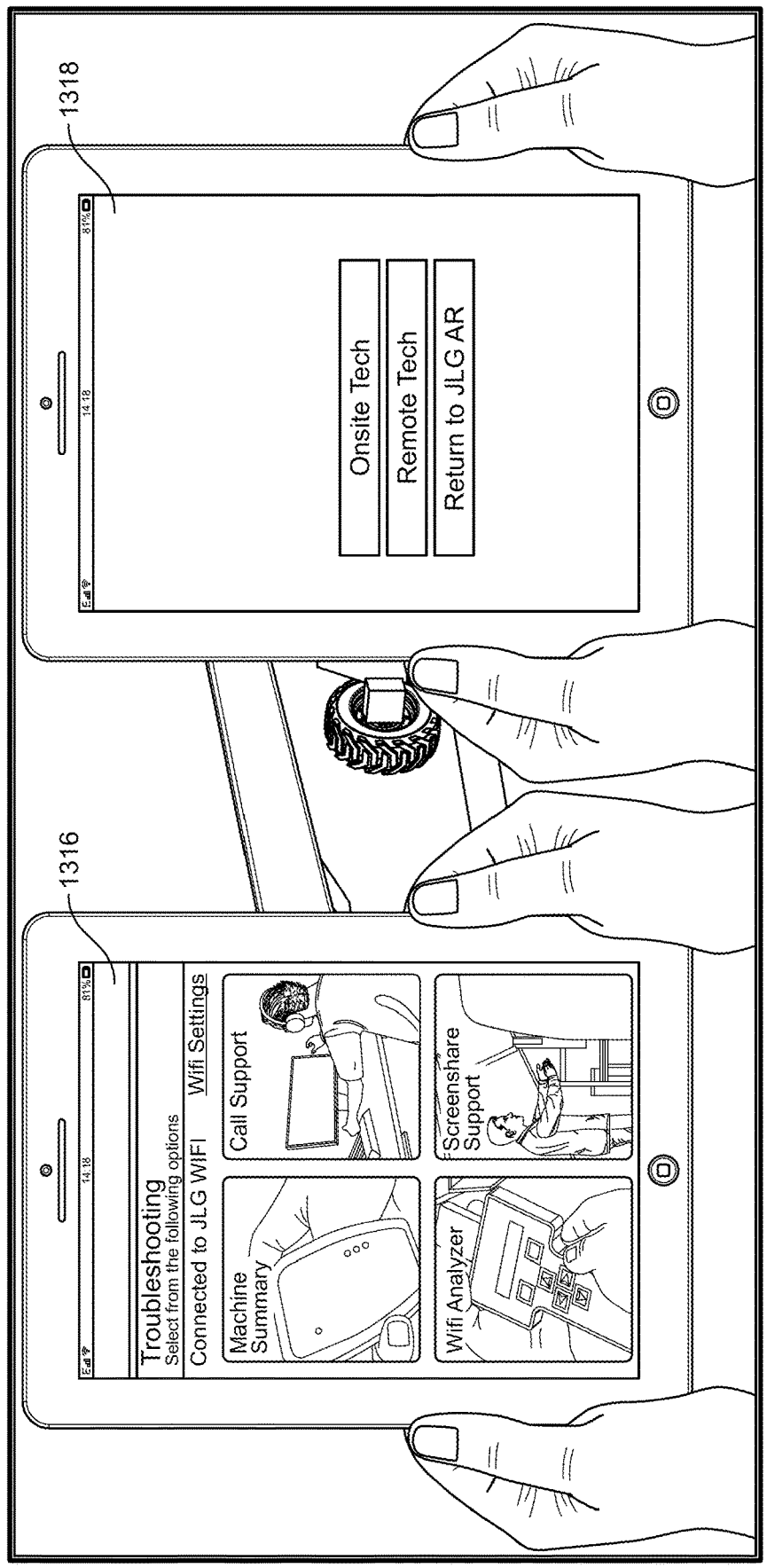
Figure 13F:
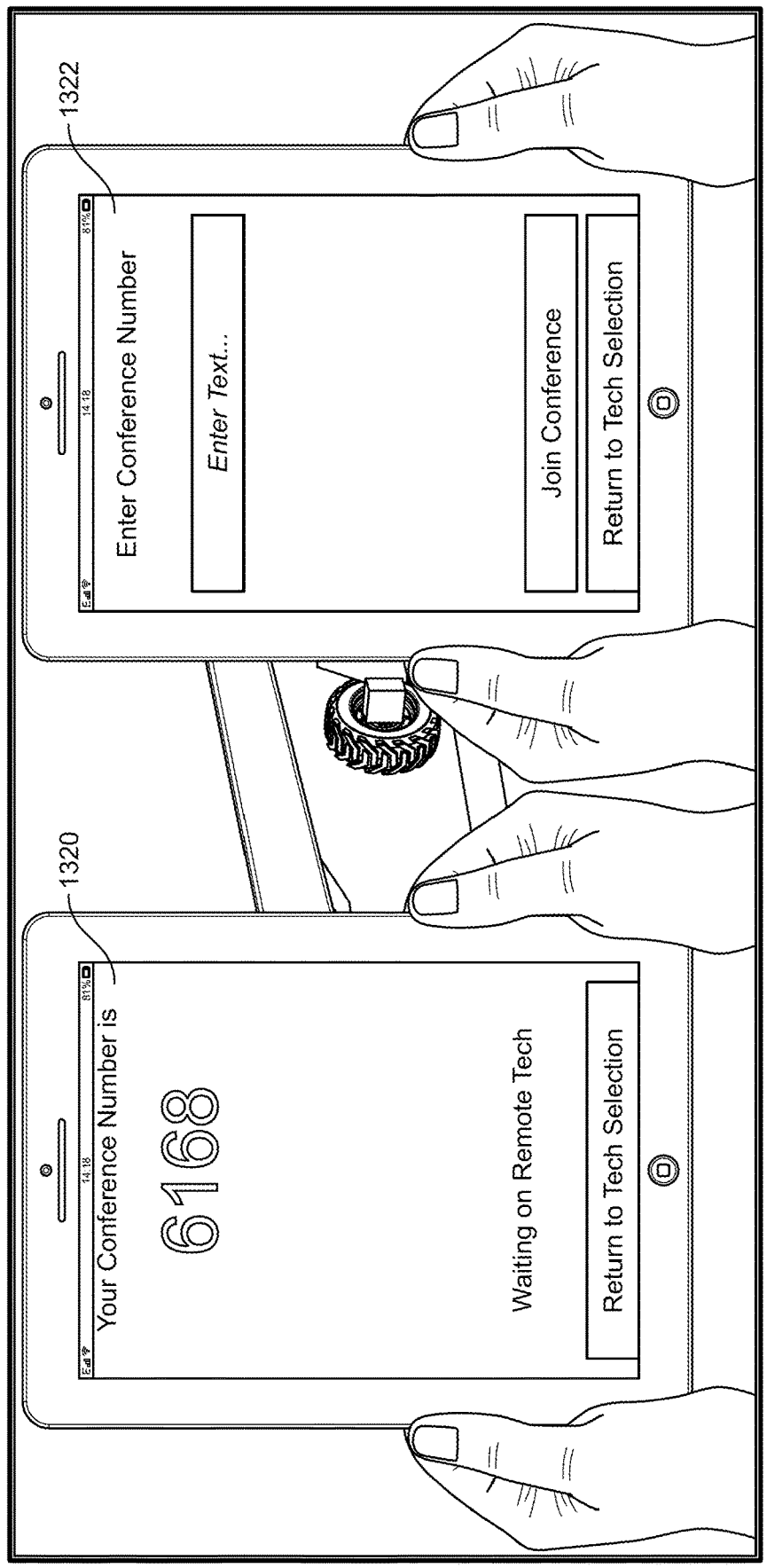
Figure 13G:
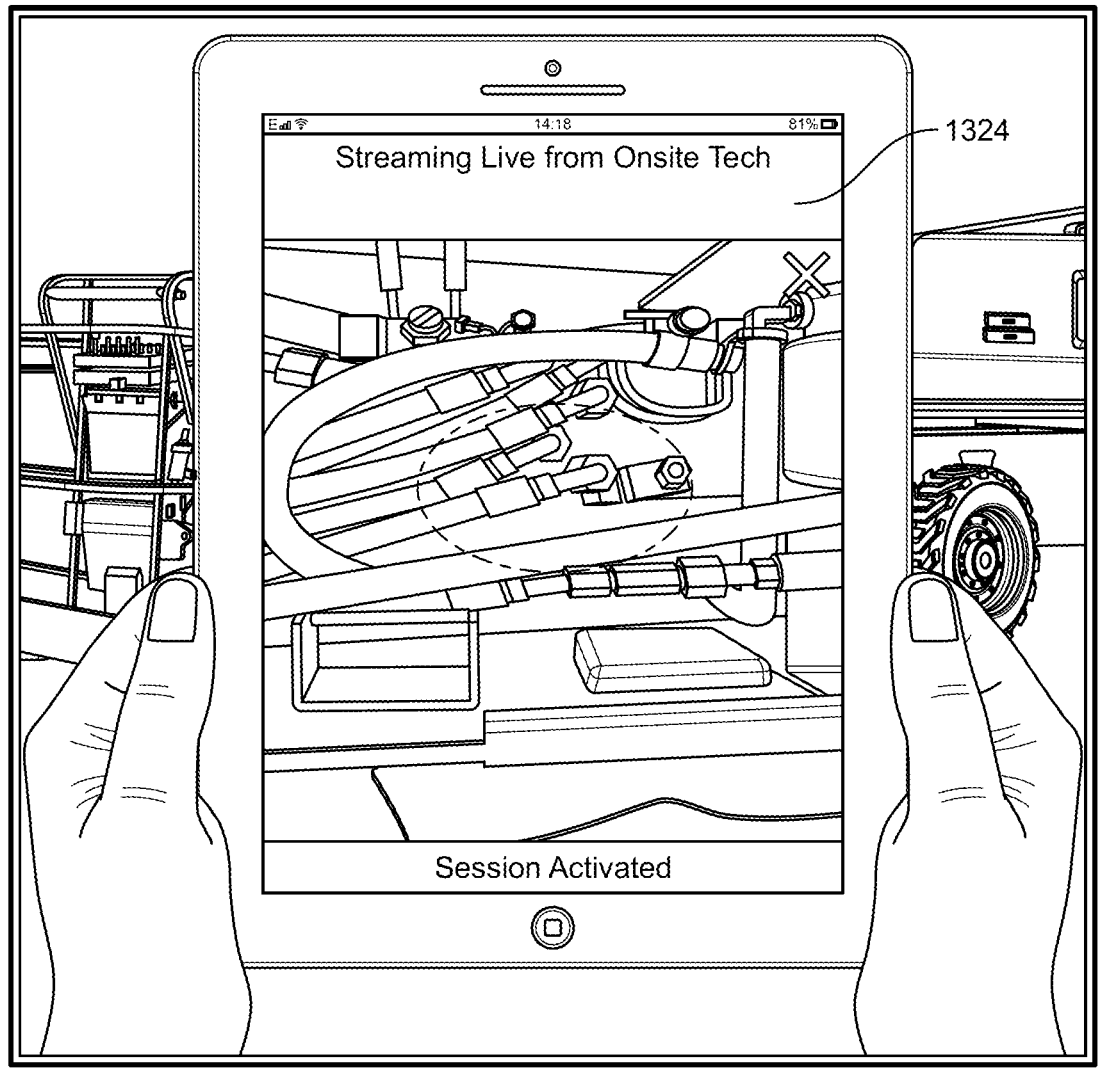
Figure 13H:
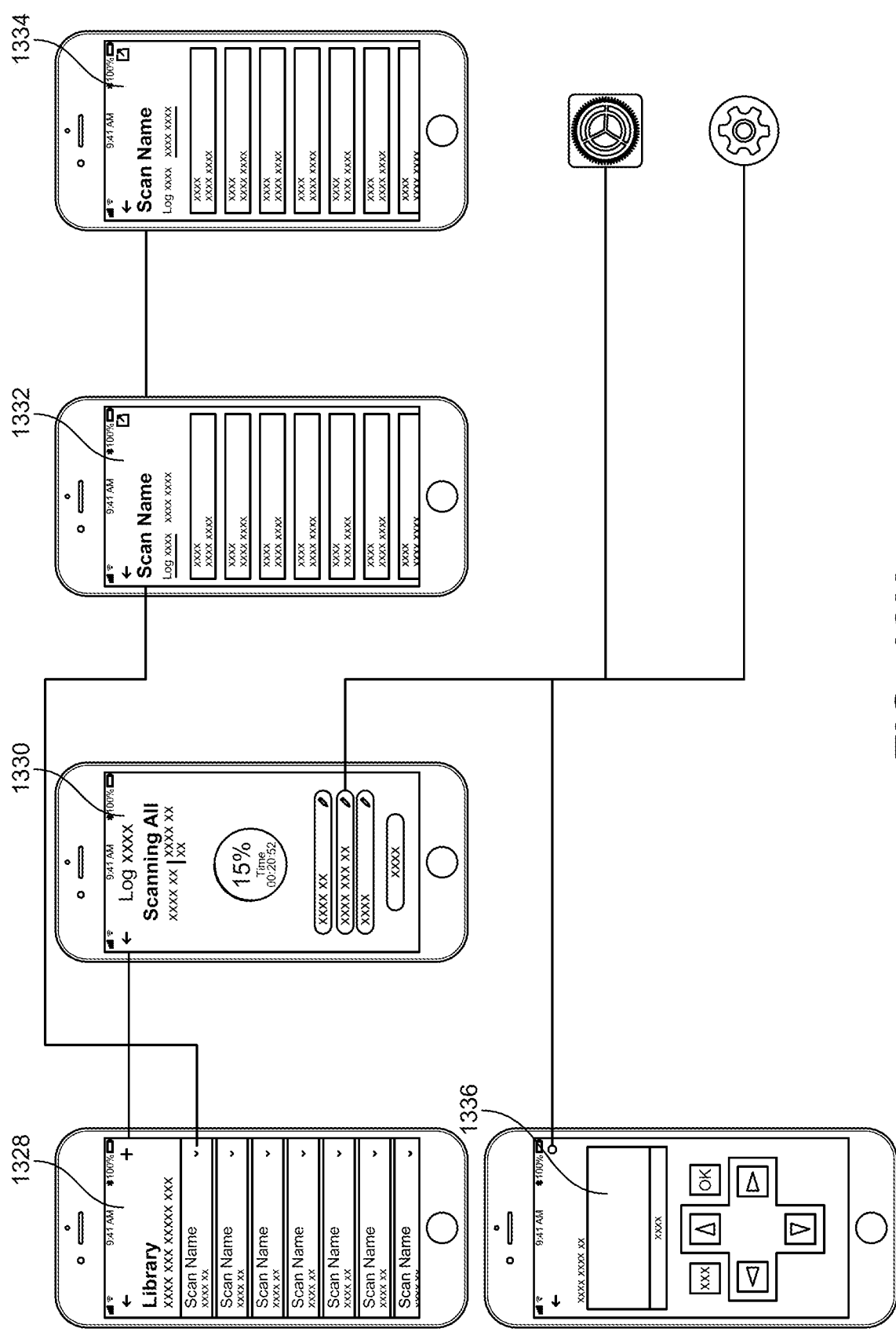
Figure 13I:
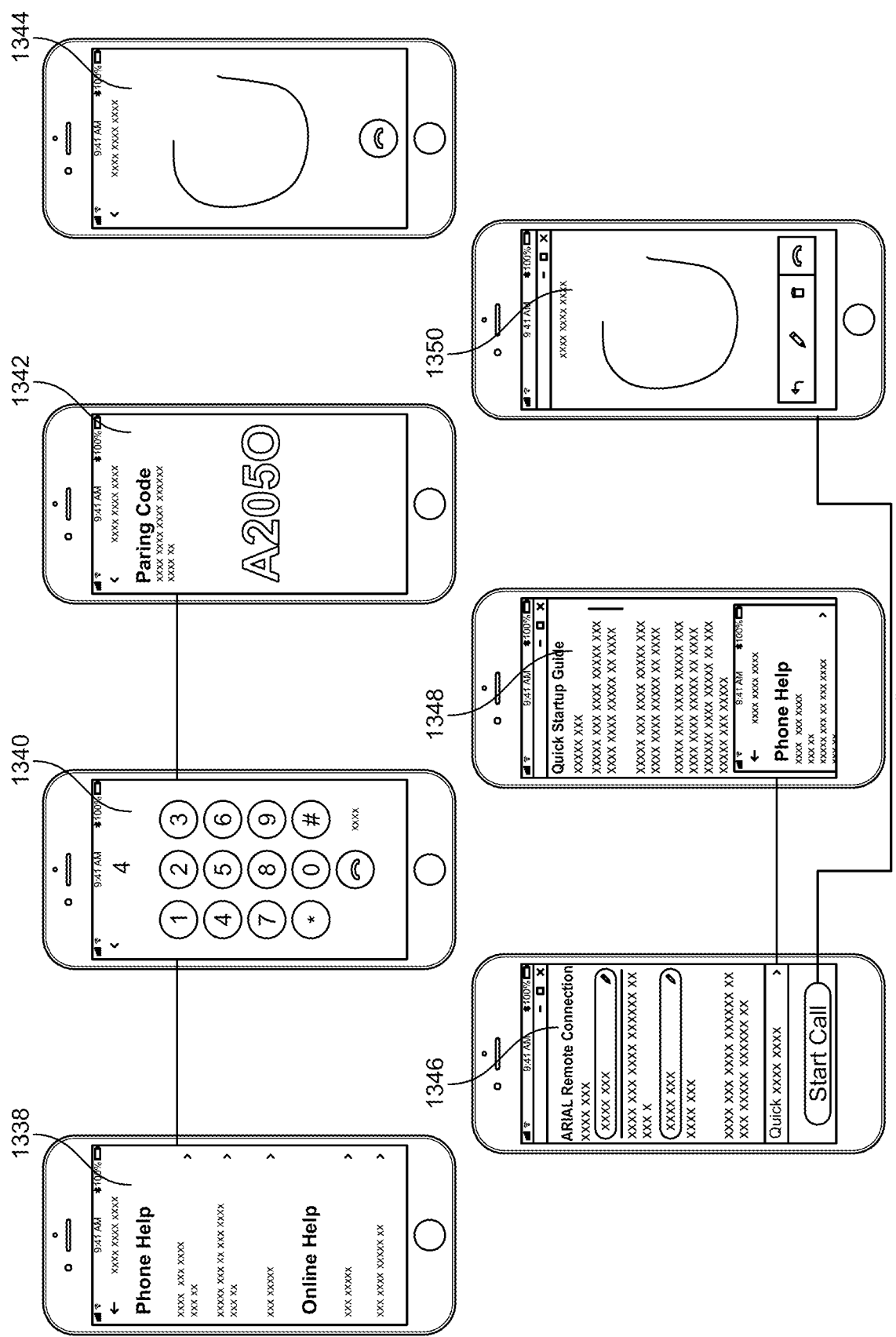

Referring now to FIG. 12, a process 1200 for visualizing attachments for equipment in AR is shown, according to an exemplary embodiment. Process 1200 may be implemented by application 114 within server 112. Process 1200 is shown to include providing an augmented reality application to a user interface (step 1202). In an exemplary embodiment, user device 104 displays application 114 which may be an application that provides augmented reality functionality. Application 114 may be provided to an interface of user device 104 via instructions from user 102, such as clicking on an application icon on user device 104.

Process 1200 is shown to include selecting an attachment profile from a database of attachment profiles (step 1204). In an exemplary embodiment, equipment database 110 includes several attachment (e.g., attachments to pieces of equipment, etc.) profiles. These profiles may include information relating to the attachments to machines that indicate their physical structure, design, or operational parameters. For example, equipment database 110 includes a profile for railing for boom lift model A1 that includes the dimensions of the railing. Attachment visualization module 218 may be configured to process this equipment information and generate a virtual model of the attachment that may be displayed on a user interface through application 114 via AR.

Process 1200 is shown to include overlaying the virtual attachment on an equipment device in the real word, based on instructions received via the user interface (step 1206). In some embodiments, application 104 may provide the virtual attachment to user device 104 via AR. In an exemplary embodiment, the virtual attachment may resemble the physical structure of the actual machine for viewing purposes.

Referring now to FIGS. 13A-I, various embodiments of interfaces (e.g., 1302-1350) are shown, according to exemplary embodiments. FIGS. 13A-I may be configured to show various steps through a process (e.g., process 1400, etc.) for implementing annual inspection module 220 on user device 104.

Figure 14:
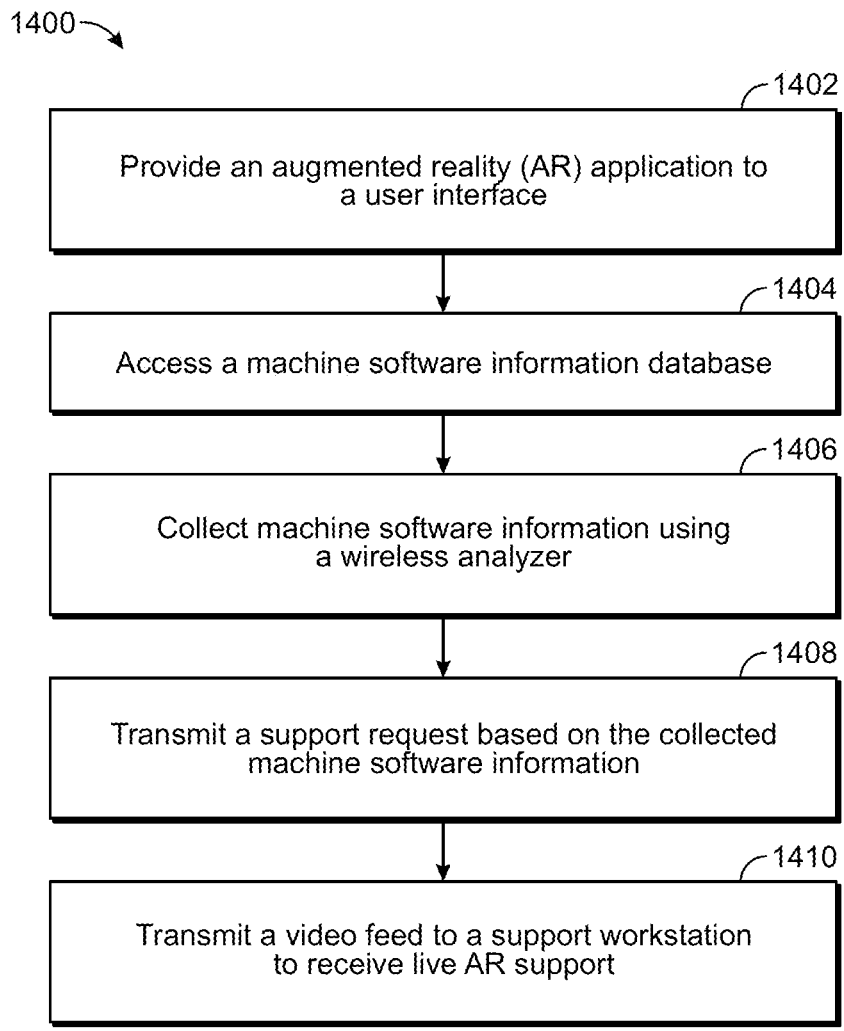
FIG. 14 is a flow diagram of a process for remotely troubleshooting a fault in a building equipment system, which may be performed by the application as shown in FIG. 2, according to an exemplary embodiment.

Referring now to FIG. 14, a process 1400 for troubleshooting equipment using AR is shown, according to an exemplary embodiment. Process 1400 may be implemented by application 114 within server 112. Process 1400 is shown to include providing an augmented application to a user interface (step 1402).

Process 1400 is shown to include accessing a machine software information database (step 1404). Step 1404 may be performed using a wireless access network analyzer dongle (e.g., WANalyzer). The WANalyzer may allow user 102 to access machine software information that may be stored directly within memory on AR-compatible equipment 106 or within equipment database 110. In an exemplary embodiment, the WANalyzer is an external component connected wired or wirelessly to user device 104 that, when connected, application 114 queries a machine for its machine software information via the WANalyzer.

Process 1400 is shown to include collecting machine software information using a wireless analyzer (step 1406). This may allow user 102 to see all machine information in a summary form (e.g., on the user interface of user device 104, etc.) instead of scrolling through interface at each level and separately keeping track of the information. This information may be saved to the user's phone or tablet and associated with the specific machine. This information may then be shared via email or other means.

Process 1400 is shown to include transmitting a support request based on the collected machine software information (step 1408). This may allow user 102 to place a phone call to support services (e.g., service technicians, service company, etc.). In an exemplary embodiment, a machine summary may need to be implemented prior to performing a service call. The machine summary can then be shared with the support services, which can save time in troubleshooting and fault detection.

Process 1400 is shown to include transmitting video feed to a support workstation to provide live AR support (step 1410). This may allow user 102 to share their phone or tablet (e.g., user device 104) camera with the support services and allow support services to interact (e.g., draw on screen) with application 114 on user device 104 and visualize equipment or components to user device 104 in AR.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the applications (e.g., application 114) as shown in the various exemplary embodiments is illustrative only. Additionally, any element disclosed in one embodiment may be incorporated or utilized with any other embodiment disclosed herein. For example, the module 210 of the exemplary embodiment shown in FIG. 2 may be incorporated in module 212 of the exemplary embodiment shown in FIG. 2. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A method for optimizing equipment inspection for a machine using augmented reality (AR), the method comprising:
   providing an AR application to a user interface;
   obtaining image data of an equipment decal on the machine, the equipment decal comprising at least one symbol and at least one printed word describing a warning regarding a characteristic of the machine;
   determining a model of the machine by matching the at least one symbol and the at least one printed word of the equipment decal with a corresponding at least one symbol and at least one printed word of a corresponding equipment decal in a database of predetermined decals and retrieving warning information corresponding to the characteristic of the machine;
   displaying one or more selectable widgets for the equipment decal on the user interface via AR functionality;
   receiving, via the user interface, a selection of the selectable widget, the selection providing instructions to provide additional material based on the selectable widget; and
   prior to operation of the machine, displaying the warning information to warn the user regarding the characteristic of the machine, recommended operation of the machine and precautionary measures for the machine to avoid a potential hazard that may result due to improper operation of the machine.

2. The method of claim 1, wherein the equipment decal comprises at least one of a danger decal, a warning decal, a caution decal, an important decal, or a notice decal.

3. The method of claim 1, further comprising:
   detecting, via the user interface, an equipment control panel on the machine;
   matching the equipment control panel with a second set of stored equipment information;
   overlaying a second selectable widget with the equipment control panel on the user interface of the AR application; and
   providing the second set of stored equipment information to the user interface.

4. The method of claim 1, further comprising:
   displaying an annual inspection process on the user interface;
   receiving, via the user interface, at least one of a machine, owner, or technician information;
   directing a user to inspect the machine based on the at least one of a machine, owner, or technician information; and
   receiving an update based on the inspection, wherein the update comprises an indication of passing inspection, failing inspection, or needing correction.

5. The method of claim 1, further comprising:
   selecting a machine profile from a database of machine profiles;
   overlaying a virtual machine in the real world, wherein the virtual machine is based on the machine profile; and
   adjusting the virtual machine based on instructions received via the user interface.

6. The method of claim 1, further comprising:
   selecting an attachment profile for a machine from a database of attachment profiles;
   overlaying a virtual attachment on an equipment device in the real world, wherein the virtual attachment is based on the attachment profile; and
   adjusting the virtual attachment based on instructions received via the user interface.

7. The method of claim 1, further comprising:
   accessing a machine software information database;
   collecting a set of machine software information for a chosen machine;
   transmitting a support request based on the collected set of machine software information; and
   transmitting a video feed to a support workstation to receive live AR support.

8. A system for optimizing equipment inspection for a machine using augmented reality (AR), the system comprising:
- a user device configured to display a user interface and the machine; and
- a server comprising a processing circuit configured to perform operations comprising:
  - providing an AR application to a user interface;
  - obtaining image data of an equipment control panel on the machine, the equipment control panel comprising at least one joystick configured to operate an implement of the machine;
  - matching the equipment control panel with a corresponding equipment control panel in a database of predetermined equipment control panels based on a layout of input devices including the at least one joystick of the equipment control panel, and retrieving a set of stored equipment information associated with the equipment control panel;
  - overlaying a digital model of the equipment control panel on the user interface, the digital model being a three-dimensional graphical representation of the equipment control panel;
  - receiving, via the user interface, a selection of an element of the digital model of the equipment control panel, the element corresponding to the joystick of the equipment control panel, the selection providing instructions to provide a corresponding portion of the set of stored equipment information for the joystick of the equipment control panel; and
  - displaying the corresponding portion of the set of stored equipment information for the joystick of the equipment control panel in response to the selection, the corresponding portion of the set of stored equipment information comprising a textual description of a function of the joystick and how to operate the joystick.

9. The system of claim 8, wherein the processing circuit is further configured to:
- detect, via the user interface, an equipment decal on the machine;
- match the equipment decal with a first set of stored equipment information;
- overlay a first selectable widget with the equipment decal on the user interface of the AR application; and
- provide the first set of stored equipment information to the user interface.

10. The system of claim 9, wherein the equipment decal comprises at least one of a danger decal, a warning decal, a caution decal, an important decal, or a notice decal.

11. The system of claim 8, wherein the processing circuit is further configured to:
- display an annual inspection process on the user interface;
- receive, via the user interface, at least one of a machine, owner, or technician information;
- direct a user to inspect the machine based on the at least one of a machine, owner, or technician information; and
- receive an update based on the inspection, wherein the update comprises an indication of passing inspection, failing inspection, or needing correction.

12. The system of claim 8, wherein the processing circuit is further configured to:
- select a machine profile from a database of machine profiles;
- overlay a virtual machine in the real world, wherein the virtual machine is based on the machine profile; and
- adjust the virtual machine based on instructions received via the user interface.

13. The system of claim 8, wherein the processing circuit is further configured to:
- select an attachment profile for a machine from a database of attachment profiles;
- overlay a virtual attachment on an equipment device in the real world, wherein the virtual attachment is based on the attachment profile; and
- adjust the virtual attachment based on instructions received via the user interface.

14. The system of claim 8, wherein the processing circuit is further configured to:
- access a machine software information database;
- collect a set of machine software information for a chosen machine;
- transmit a support request based on the collected set of machine software information; and
- transmit a video feed to a support workstation to receive live AR support.

15. An equipment inspection tool for inspecting equipment via augmented reality (AR), the equipment inspection tool comprising processing circuitry configured to implement operations comprising:
- providing an AR application to a user interface;
- obtaining image data of an equipment control panel on the equipment, the equipment control panel comprising at least one joystick configured to operate an implement of the equipment;
- matching the equipment control panel with a corresponding equipment control panel in a database of predetermined equipment control panels based on a layout of input devices including the at least one joystick of the equipment control panel, and retrieving a set of stored equipment information associated with the equipment control panel;
- overlaying a digital model of the equipment control panel on the user interface, the digital model being a three-dimensional graphical representation of the equipment control panel;
- receiving, via the user interface, a selection of an element of the digital model of the equipment control panel, the element corresponding to the joystick of the equipment control panel, the selection providing instructions to provide a corresponding portion of the set of stored equipment information for the joystick of the equipment control panel; and
- displaying the corresponding portion of the set of stored equipment information for the joystick of the equipment control panel in response to the selection, the corresponding portion of the set of stored equipment information comprising a textual description of a function of the joystick and how to operate the joystick.

16. The equipment inspection tool of claim 15, wherein the processing circuitry is further configured to to:
- detect, via the user interface, an equipment decal on the equipment;
- match the equipment decal with a first set of stored equipment information;
- overlay a first selectable widget with the equipment decal on the user interface of the AR application; and
- provide the first set of stored equipment information to the user interface.

17. The equipment inspection tool of claim 15, wherein the processing circuitry is further configured to:
- detect, via the user interface, an equipment control panel on the equipment;

match the equipment control panel with a second set of stored equipment information;
overlay a second selectable widget with the equipment control panel on the user interface of the AR application; and
provide the second set of stored equipment information to the user interface.

18. The equipment inspection tool of claim 15, wherein the processing circuitry is further configured to:
display an annual inspection process on the user interface;
receive, via the user interface, at least one of a machine, owner, or technician information;
direct a user to inspect the machine based on the at least one of a machine, owner, or technician information; and
receive an update based on the inspection, wherein the update comprises an indication of passing inspection, failing inspection, or needing correction.

19. The equipment inspection tool of claim 15, wherein the processing circuitry is further configured to:
select a machine profile from a database of machine profiles;
overlay a virtual machine in the real world, wherein the virtual machine is based on the machine profile; and
adjust the virtual machine based on instructions received via the user interface.

20. The equipment inspection tool of claim 15, wherein the processing circuitry is further configured to:
access a machine software information database;
collect a set of machine software information for a chosen machine;
transmit a support request based on the collected set of machine software information; and
transmit a video feed to a support workstation to receive live AR support.

* * * * *